United States Patent [19]
Cromack et al.

[11] Patent Number: 5,821,033
[45] Date of Patent: Oct. 13, 1998

[54] PHOTOLITHOGRAPHIC PRODUCTION OF MICROPROTRUSIONS FOR USE AS A SPACE SEPARATOR IN AN ELECTRICAL STORAGE DEVICE

[75] Inventors: Douglas Cromack, Menlo Park; Mark L. Goodwin, Santa Cruz, both of Calif.; James M. Poplett, Golden Valley; Robert Tong, Fridley, both of Minn.

[73] Assignee: Pinnacle Research Institute, Inc., Los Gatos, Calif.

[21] Appl. No.: 345,068

[22] Filed: Nov. 25, 1994

(Under 37 CFR 1.47)

Related U.S. Application Data

[63] Continuation-in-part of Ser. No. 958,506, Oct. 7, 1992, abandoned, and a continuation-in-part of Ser. No. 947,294, Sep. 18, 1992, Pat. No. 5,464,453.

[51] Int. Cl.$^6$ ........................................................ G03F 7/00
[52] U.S. Cl. ............................ 430/311; 430/330; 430/396
[58] Field of Search .................................. 430/311, 322, 430/330, 396

[56] References Cited

U.S. PATENT DOCUMENTS

| | | | |
|---|---|---|---|
| 3,288,641 | 11/1966 | Rightmire . | |
| 3,536,963 | 10/1970 | Boos | 317/230 |
| 3,562,008 | 2/1971 | Martinsons et al. . | |
| 3,718,551 | 2/1973 | Martinsons | 204/98 |
| 4,052,271 | 10/1977 | Beer | 204/38 |
| 4,198,476 | 4/1980 | DiSalvo, Jr. et al. | 429/194 |
| 4,548,880 | 10/1985 | Suzuki et al. | 429/162 |
| 4,555,745 | 11/1985 | Westermeir et al. | 361/320 |
| 4,557,983 | 12/1985 | Sauer | 429/27 |
| 4,572,843 | 2/1986 | Saito et al. | 427/53.1 |
| 4,663,824 | 5/1987 | Kenmochi | 29/570 |
| 4,733,328 | 3/1988 | Blazej | 361/320 |

(List continued on next page.)

FOREIGN PATENT DOCUMENTS

| | | |
|---|---|---|
| 1196683 | 11/1985 | Canada . |
| A-44427 | 1/1982 | European Pat. Off. . |
| 2044535 | 10/1980 | United Kingdom . |

OTHER PUBLICATIONS

B.E. Conway, *J. Electrochem. Soc.*. vol. 138 (#6), p. 1539, (Jun. 1991).
H. Lee, et al., *IEEE Transactions on Magnetics*, vol. 25 (#1), p. 324. (Jan. 1989).
G. Bullard, et al., *IEEE Transactions on Magnetics*. vol.25 (#1) p. 102. (Jan. 1989).
A. Yoshida et al., *IEEE Transactions on Components, Hybrids and Manufacturing Technology*, "An Electric Double–Layer Capacitor with Activated Carbon Fiber Electrodes", vol. CHMT–10,#1, P–100–103, (Mar. 1987).
T. Suzuki, et al., *NEC Research and Development*. "Improved Self Discharge Characteristics of the Electric Double Layer Capacitor", No. 82, pp. 118–123, Jul. 1986.
S. Seikdo, *Solid State Ionics*, vol. 9, 10, pp. 777–782, (1983).
R.S. Yeo et al., in *J. Electrochem. Soc. Electrochemical Science and Technology*, vol. 128, No. 9, pp. 1900–1904, Sep. 1981.

(List continued on next page.)

*Primary Examiner*—Kathleen Duda
*Attorney, Agent, or Firm*—Peters, Verny, Jones & Biksa, L.L.P.

[57] ABSTRACT

The present invention relates to a photolithographic method to produce multiple, electrically insulating microprotrusions on an electrically conducting substrate to produce and maintain substantially uniform space separation between the substrates which act as electrodes in a double layer capacitor or battery configuration. Preferably, the electrically insulating microprotrusions are an organic photocurable epoxide polymer, a photocurable acrylic polymer or combinations thereof.

20 Claims, 11 Drawing Sheets

U.S. PATENT DOCUMENTS

| | | | |
|---|---|---|---|
| 4,764,181 | 8/1988 | Nakano et al. | 29/570.1 |
| 4,774,193 | 9/1988 | Juergens | 437/4 |
| 4,800,142 | 1/1989 | Bish et al. | 429/130 |
| 4,816,356 | 3/1989 | Balkanski | 429/191 |
| 4,862,328 | 8/1989 | Morimoto et al. | 361/502 |
| 5,032,426 | 7/1991 | Sumner, Jr. | 427/96 |
| 5,055,169 | 10/1991 | Hock, Jr. et al. | 204/192.31 |
| 5,062,025 | 10/1991 | Verhoeven et al. | 361/509 |
| 5,063,340 | 11/1991 | Kalenowsky . | |
| 5,072,335 | 12/1991 | Kurabayashi et al. | 361/502 |
| 5,085,955 | 2/1992 | Cipriano | 429/197 |
| 5,116,695 | 5/1992 | Rao et al. | 429/12 |
| 5,116,701 | 5/1992 | Kalisz | 429/130 |
| 5,121,288 | 6/1992 | Maeroka et al. | 361/329 |
| 5,141,828 | 8/1992 | Bennion et al. | 429/210 |
| 5,148,355 | 9/1992 | Lowe et al. | 361/410 |
| 5,217,831 | 6/1993 | White | 430/311 |
| 5,230,990 | 7/1993 | Iwasaki et al. | 430/321 |
| 5,268,006 | 12/1993 | Ueno et al. | 29/25.03 |
| 5,344,748 | 9/1994 | Feely | 430/311 |

OTHER PUBLICATIONS

R.S. Yeo et al., in *Abstracts of meeting of The Electrochemical Society*, Oct. 14–19, 1979, Abstract No. 652, p. 1637, published 1979.

L.D. Burke et al., in *J. Electroanal. Chem.* 112, (1980), pp. 39–50.

D. Galizzioli et al., in *Journal of Applied Electrochemistry*, vol. 4, (1974), pp. 57–67.

D. Galizzioli et al., in *Journal of Applied Electrochemistry*, vol. 5, (1975), pp. 203–214.

S.Trasatti et al, in *J. Electroanal. Chem.*, vol. 29, (1971), App. 1–5.

S. Hadzi–Jordanov et al., in *J. Electrochem. Soc. Electrochemical Science and Technology*, Sep. 1978, pp. 1471–1480.

S.H. Glarum et al., in *J. Electrochem. Soc. Electrochemical Science and Technology*, Jul. 1980, pp. 1467–1474.

B.E. Conway et al., in *Trans. Faraday Soc.*, (1962), vol. 58, p. 2493ff.

M. Pham–Thi et al., the *Journal of Materials Science Letters*, vol. 5, p. 415, (1986).

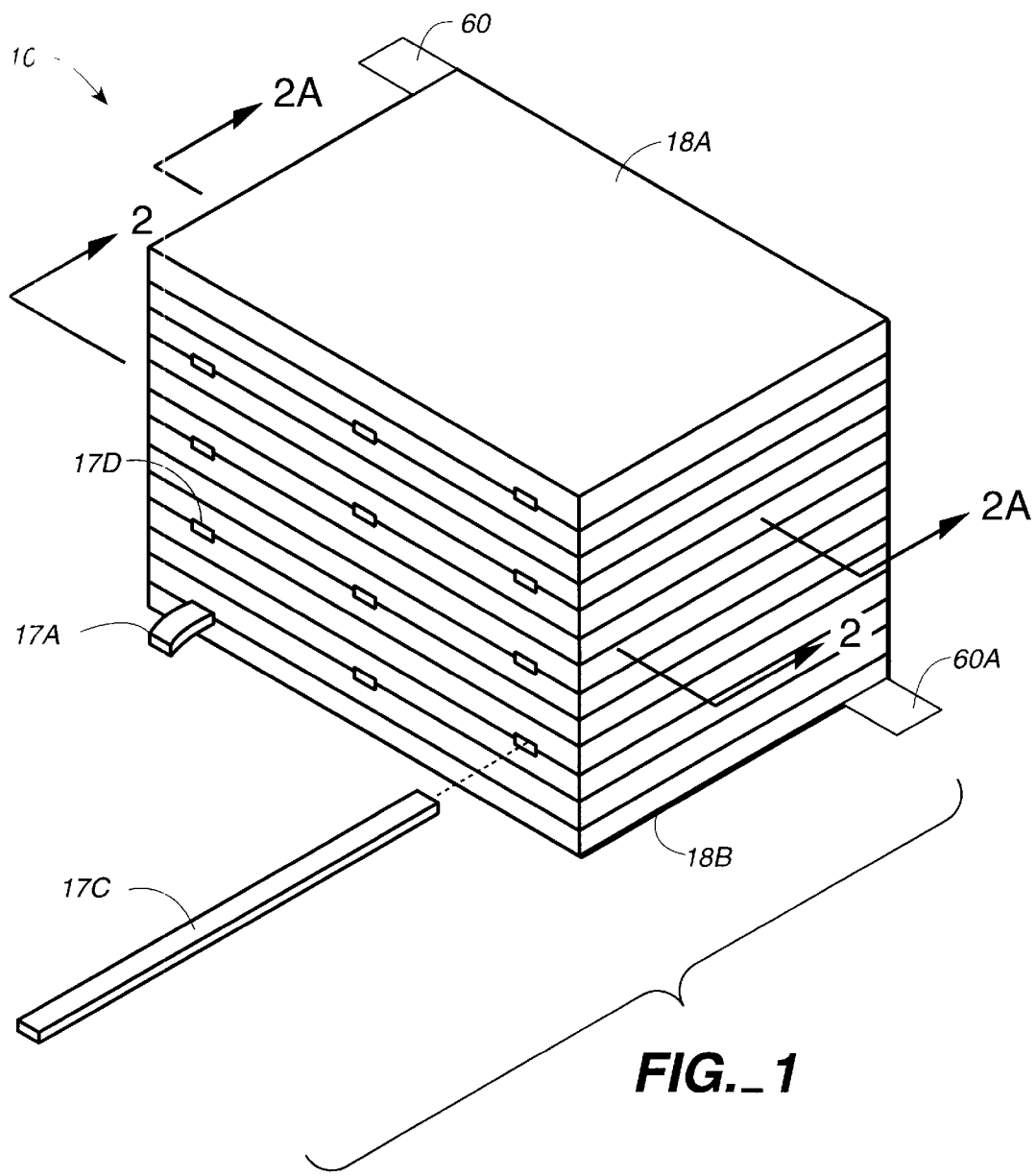
FIG._1

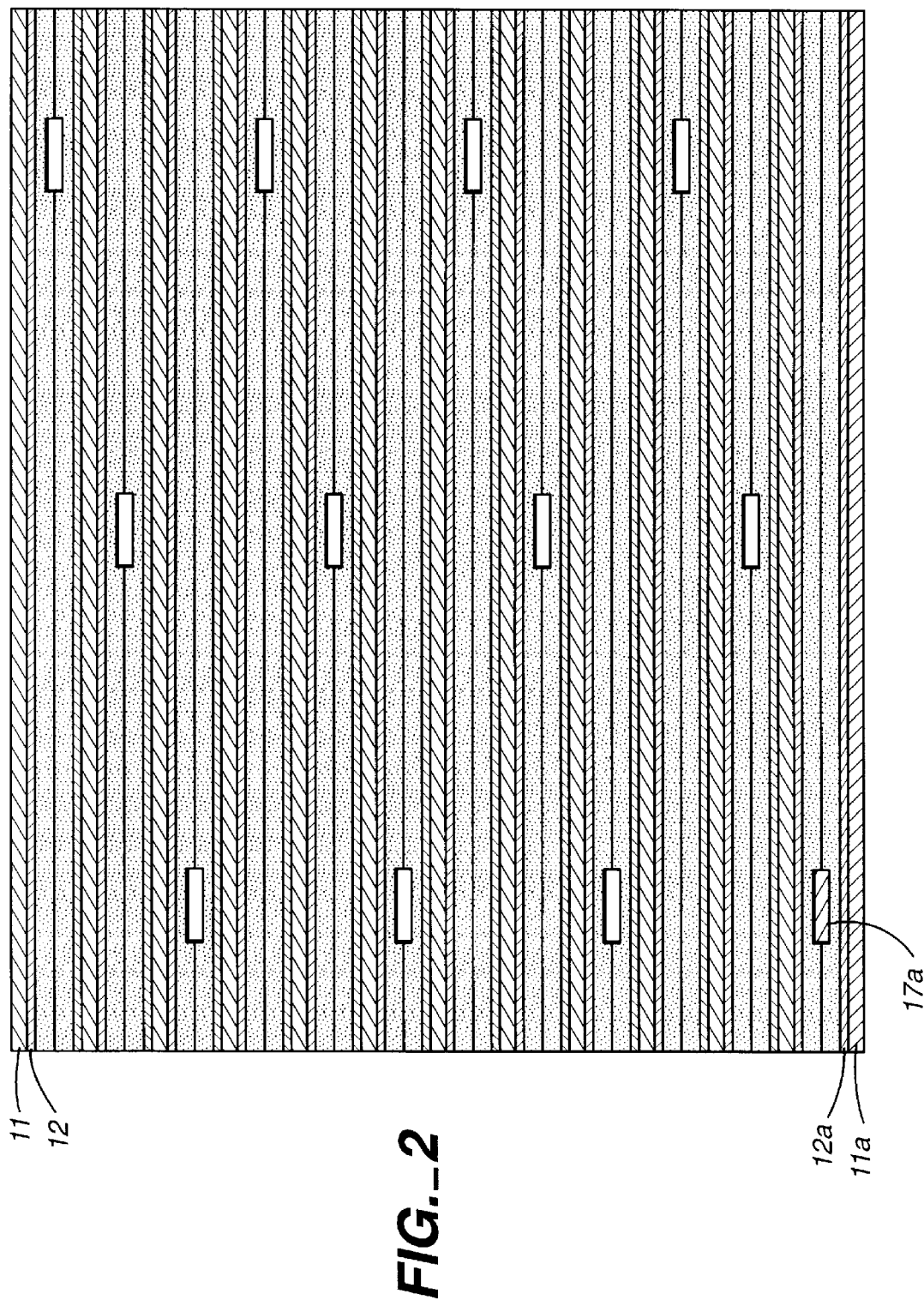
FIG._2

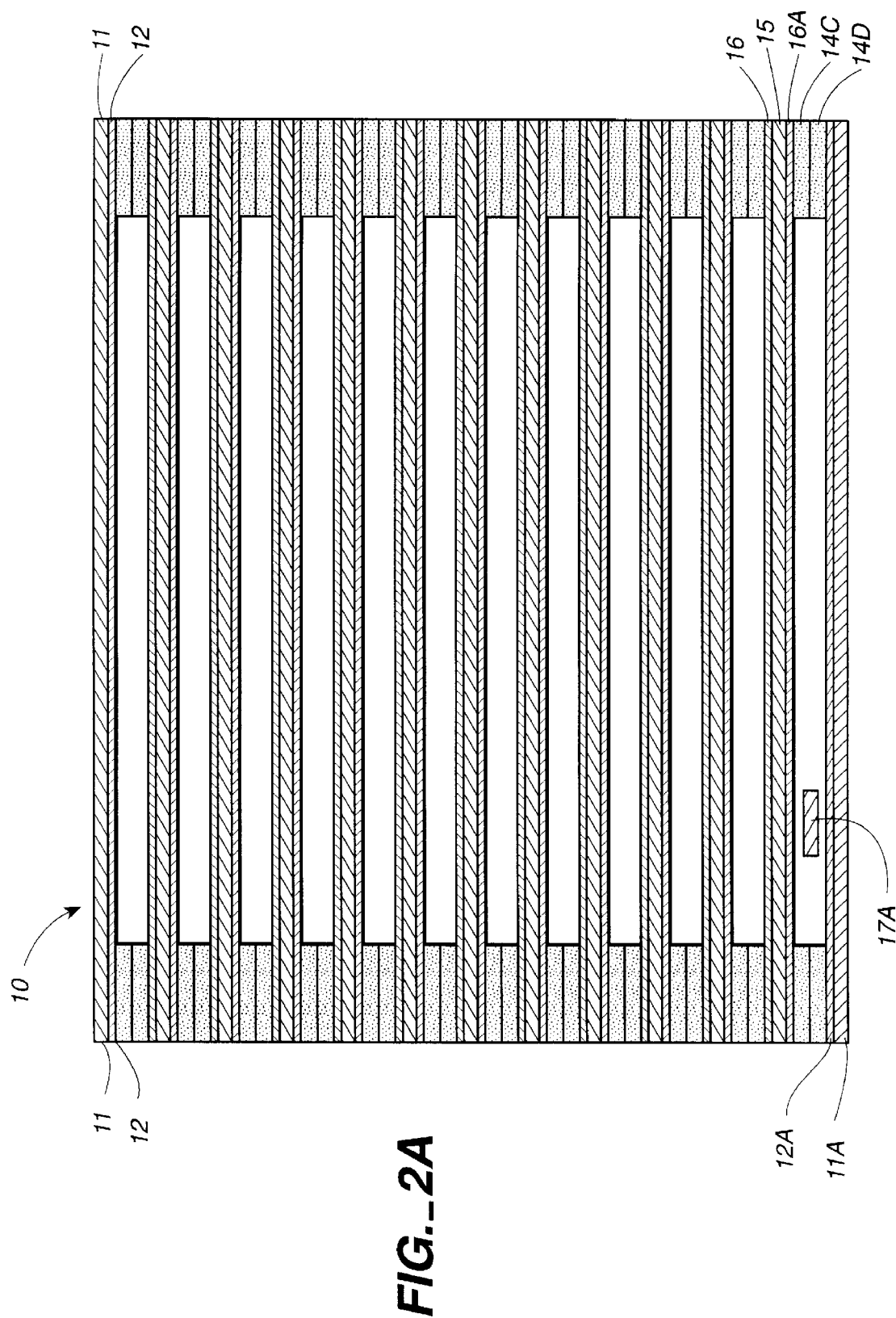

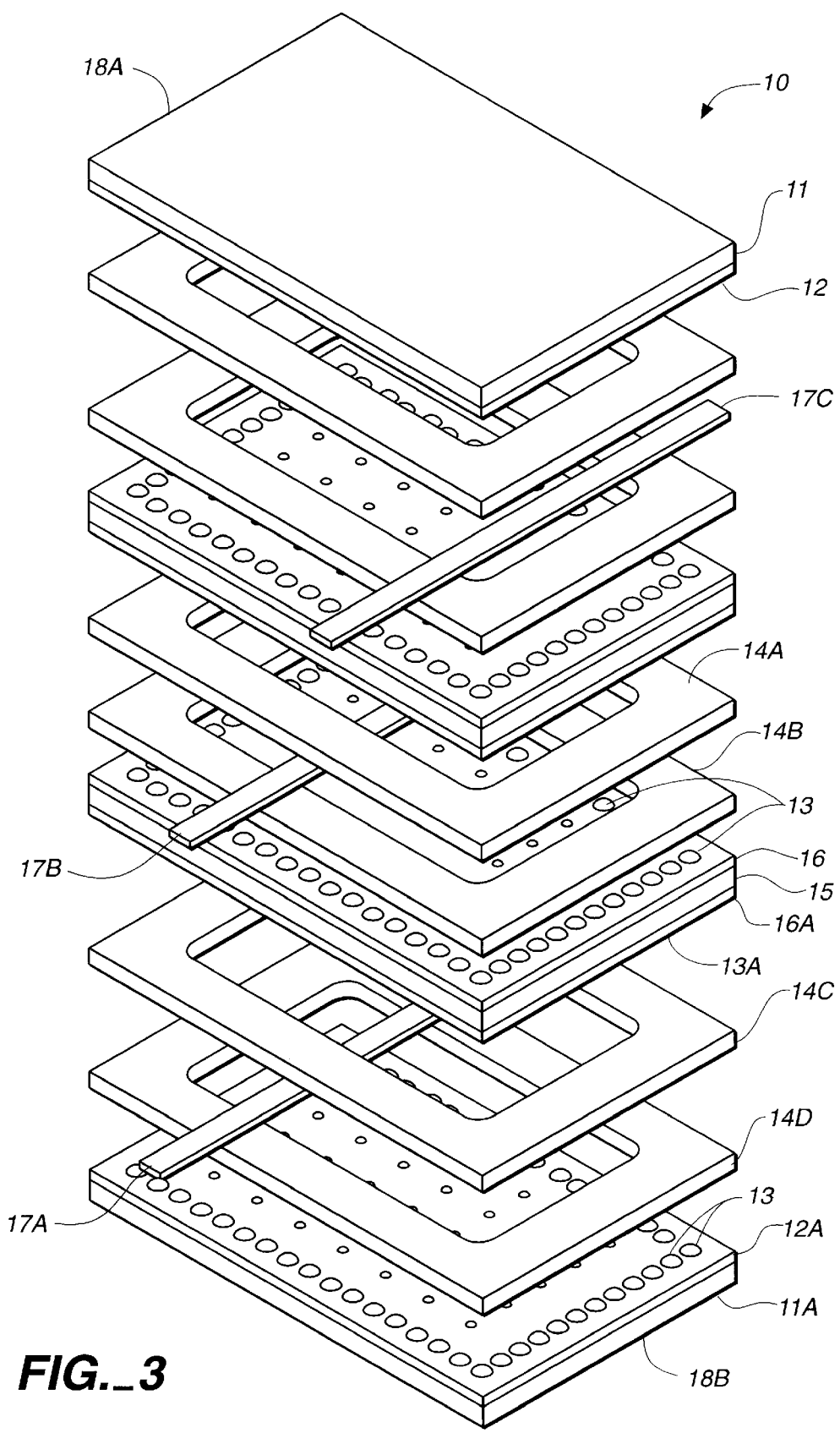
FIG._3

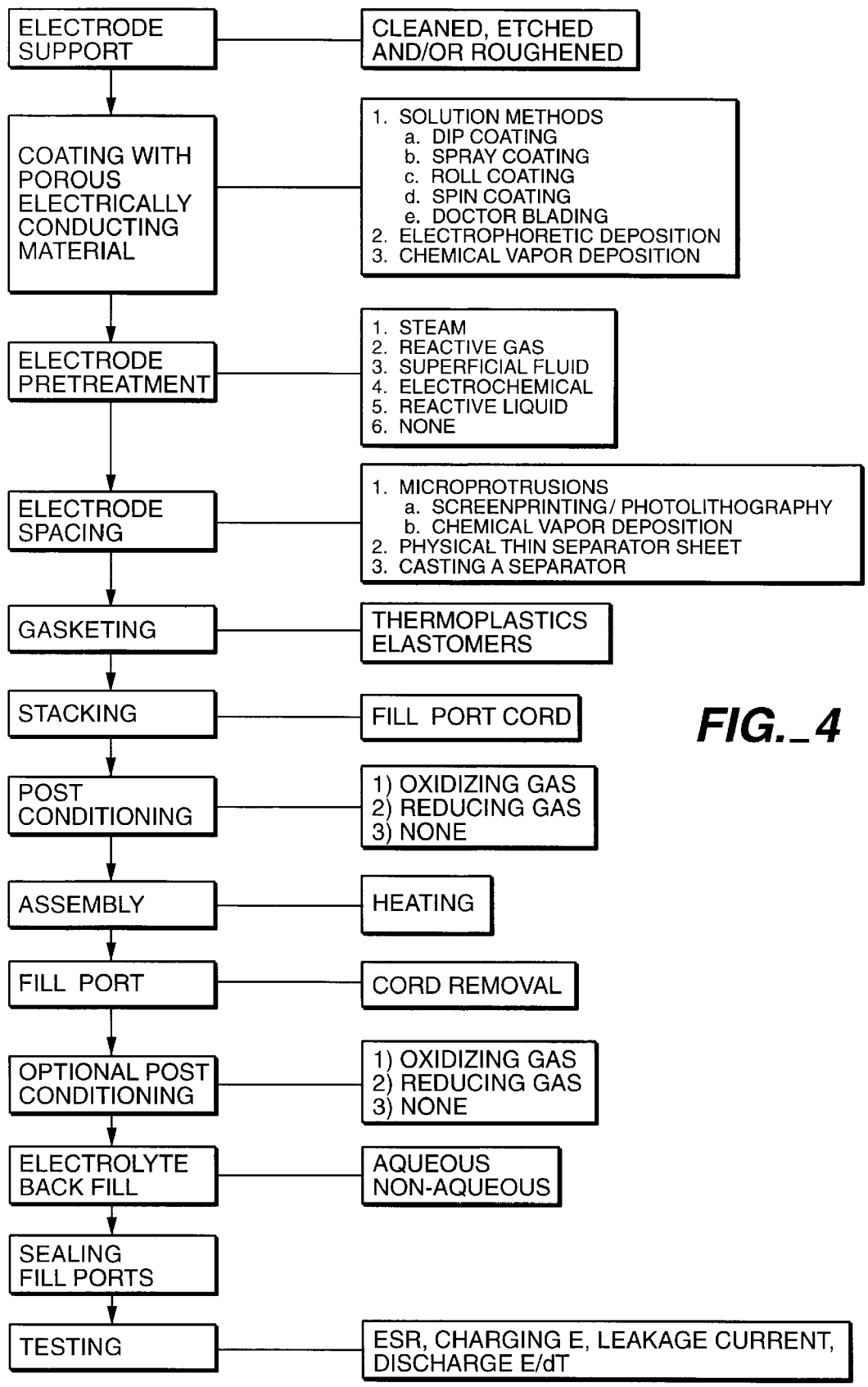
FIG._4

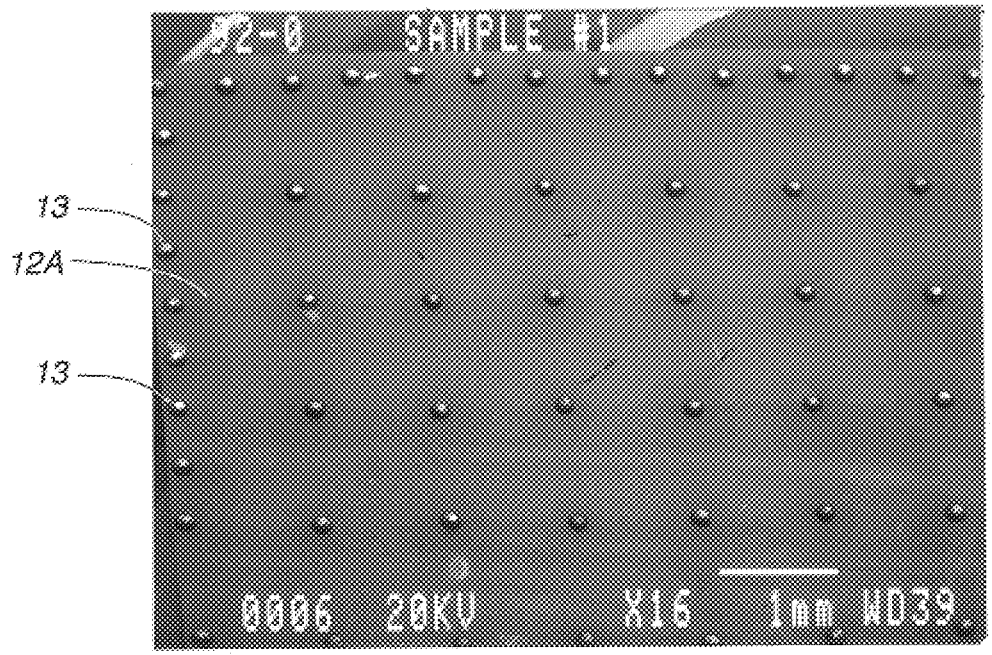
FIG._5
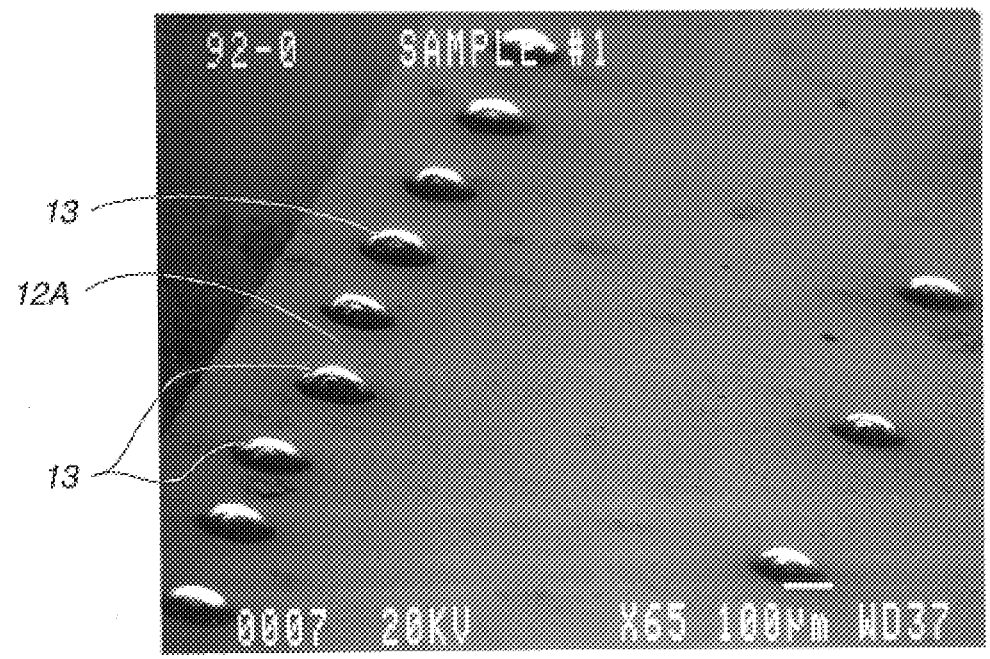
FIG._5A

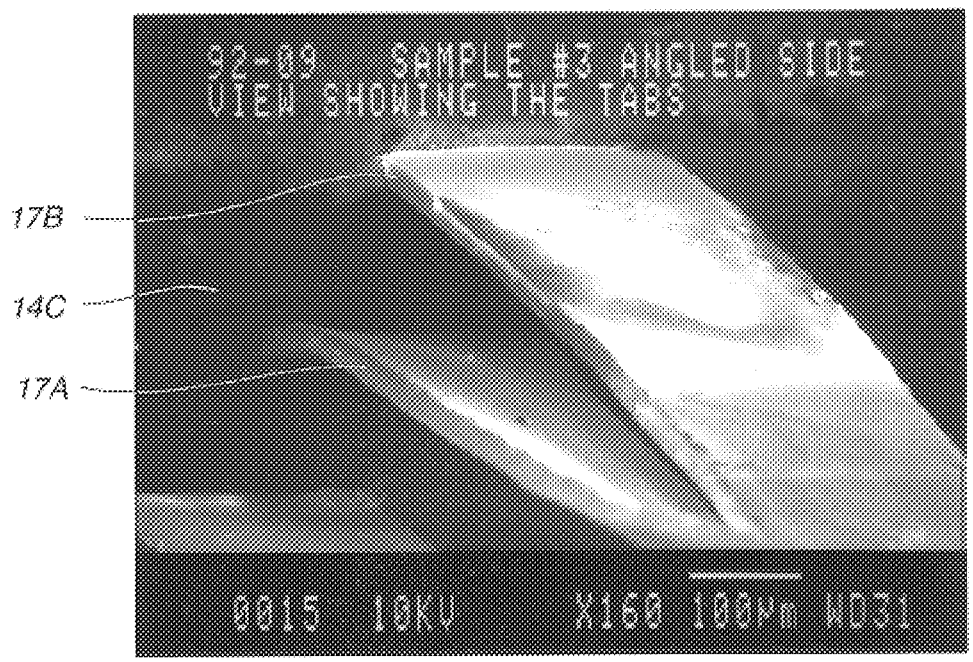
FIG._6
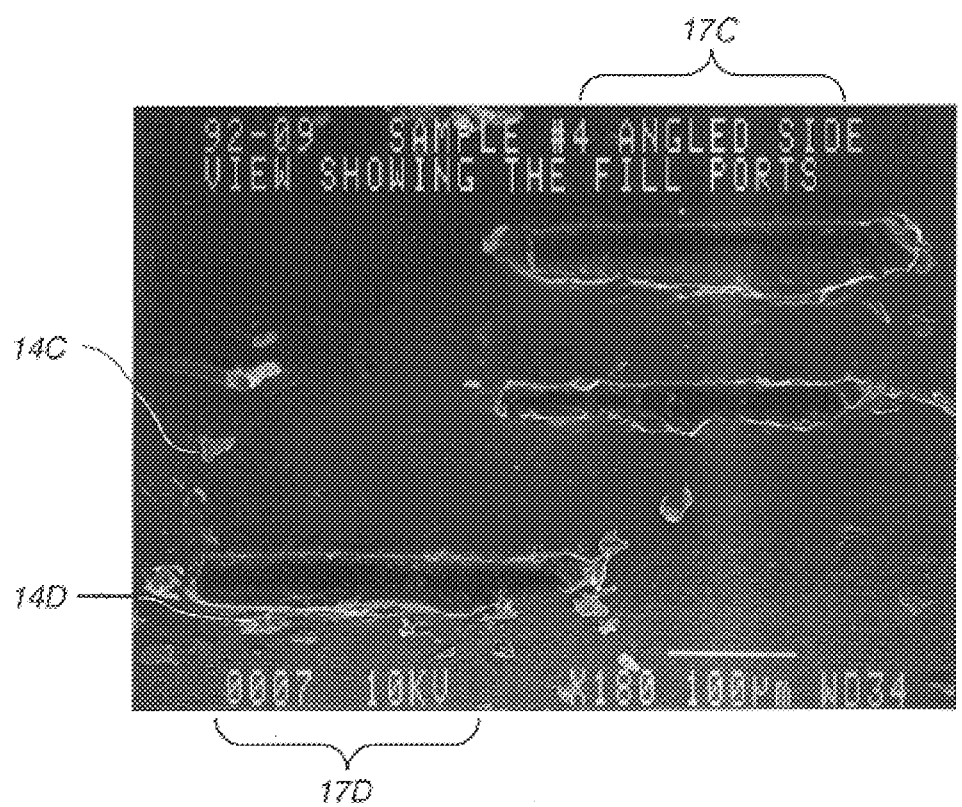
FIG._6A

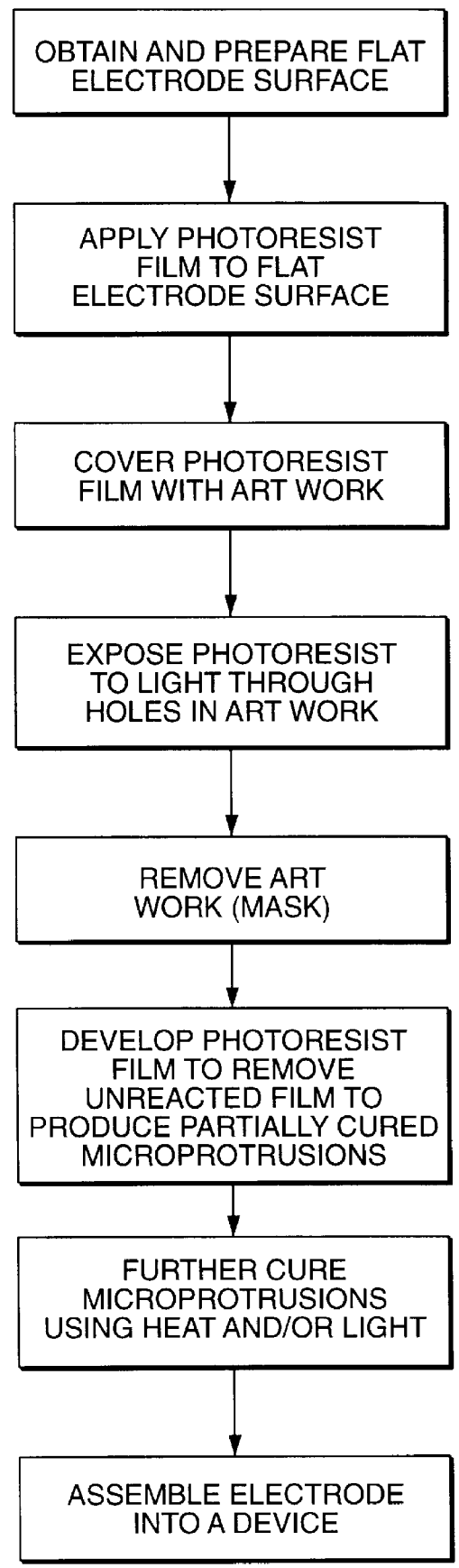
FIG._7

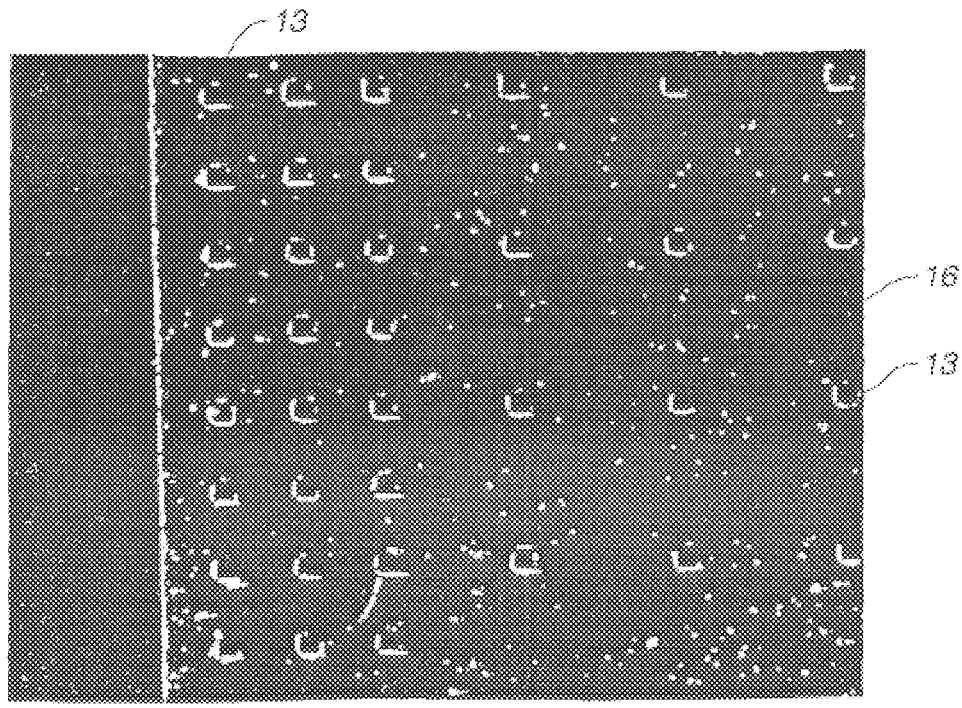
FIG._8
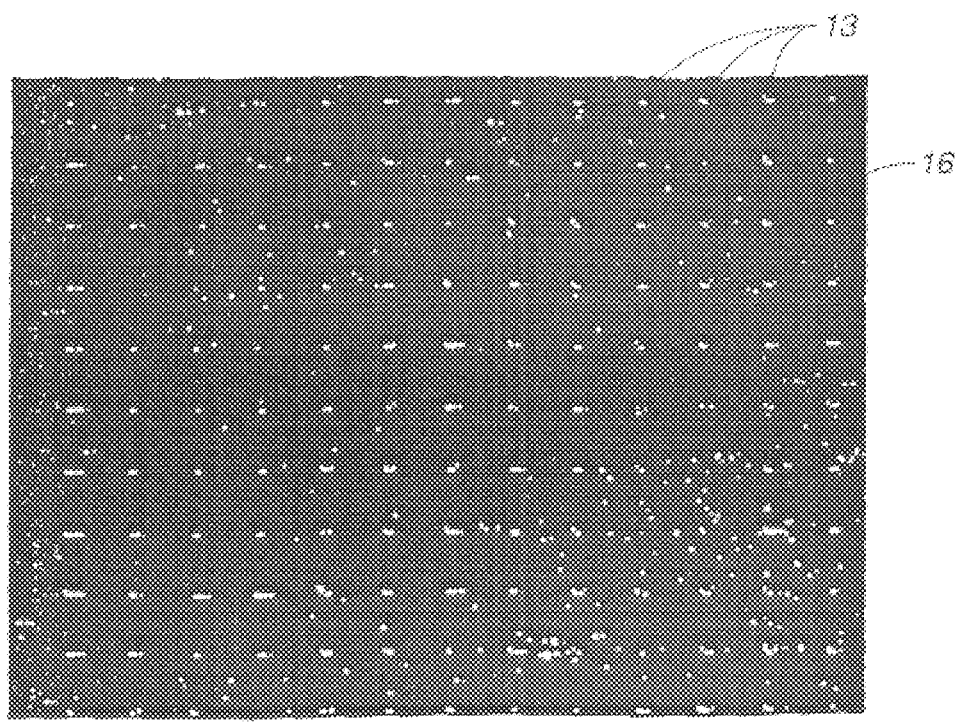
FIG._9

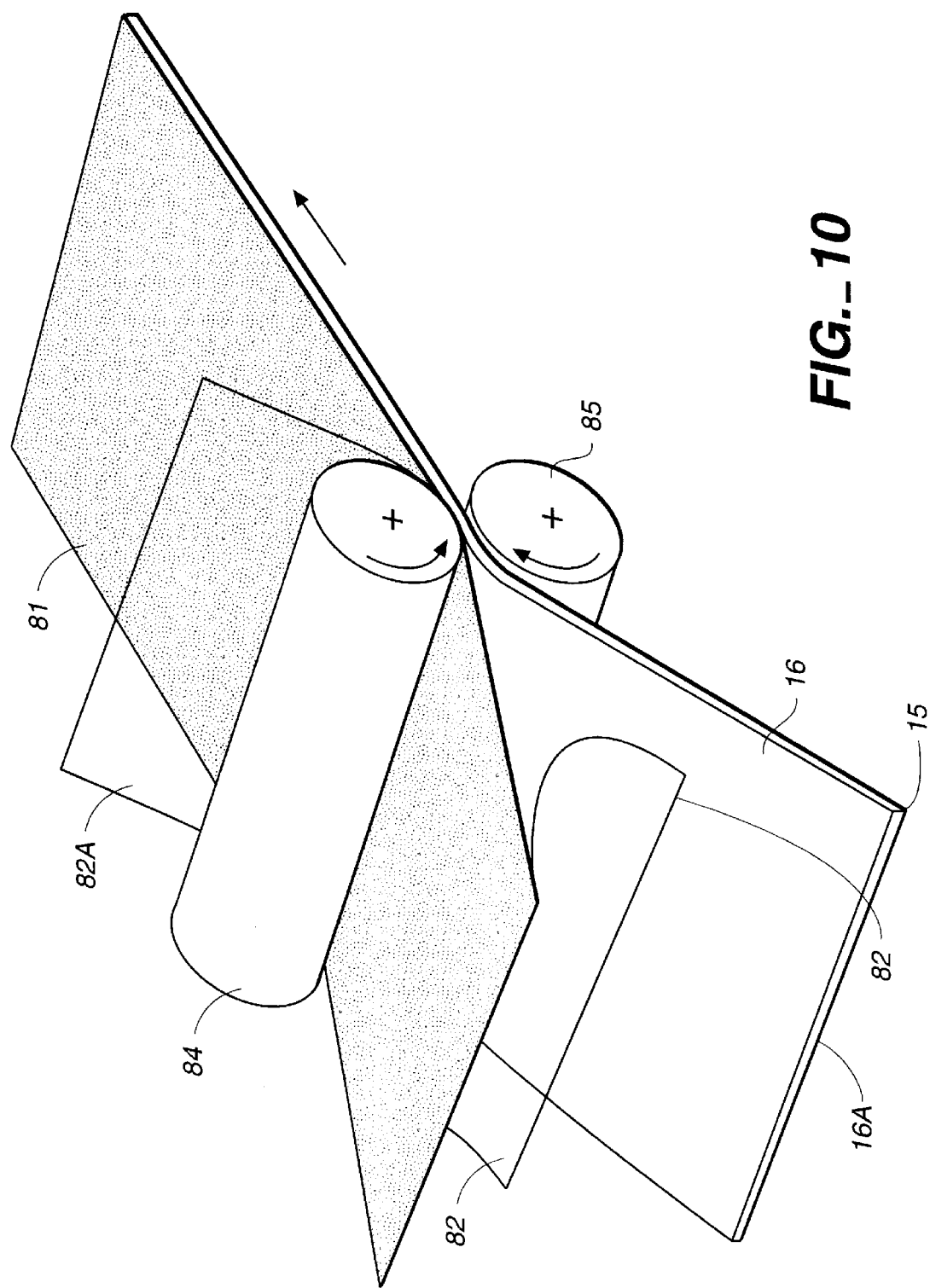

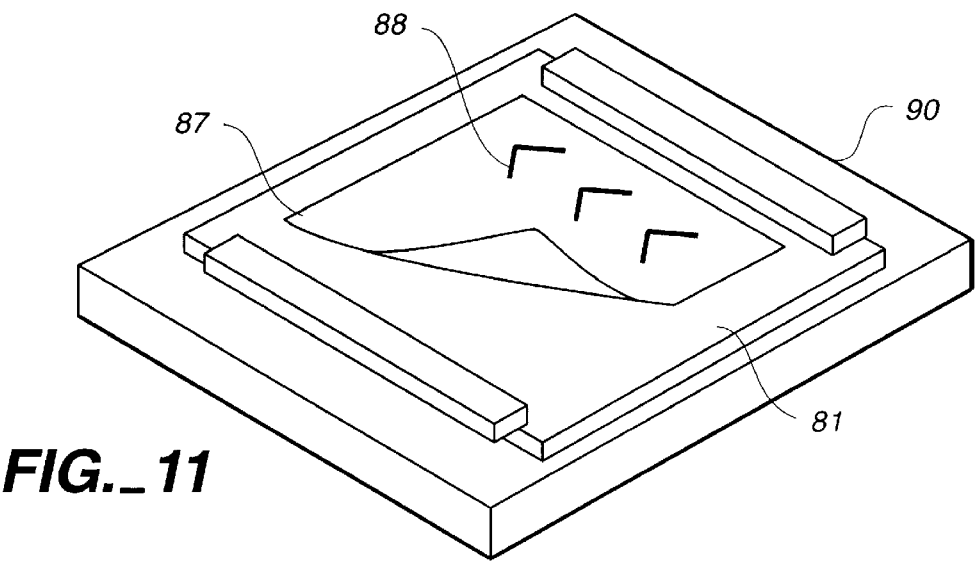
FIG._11
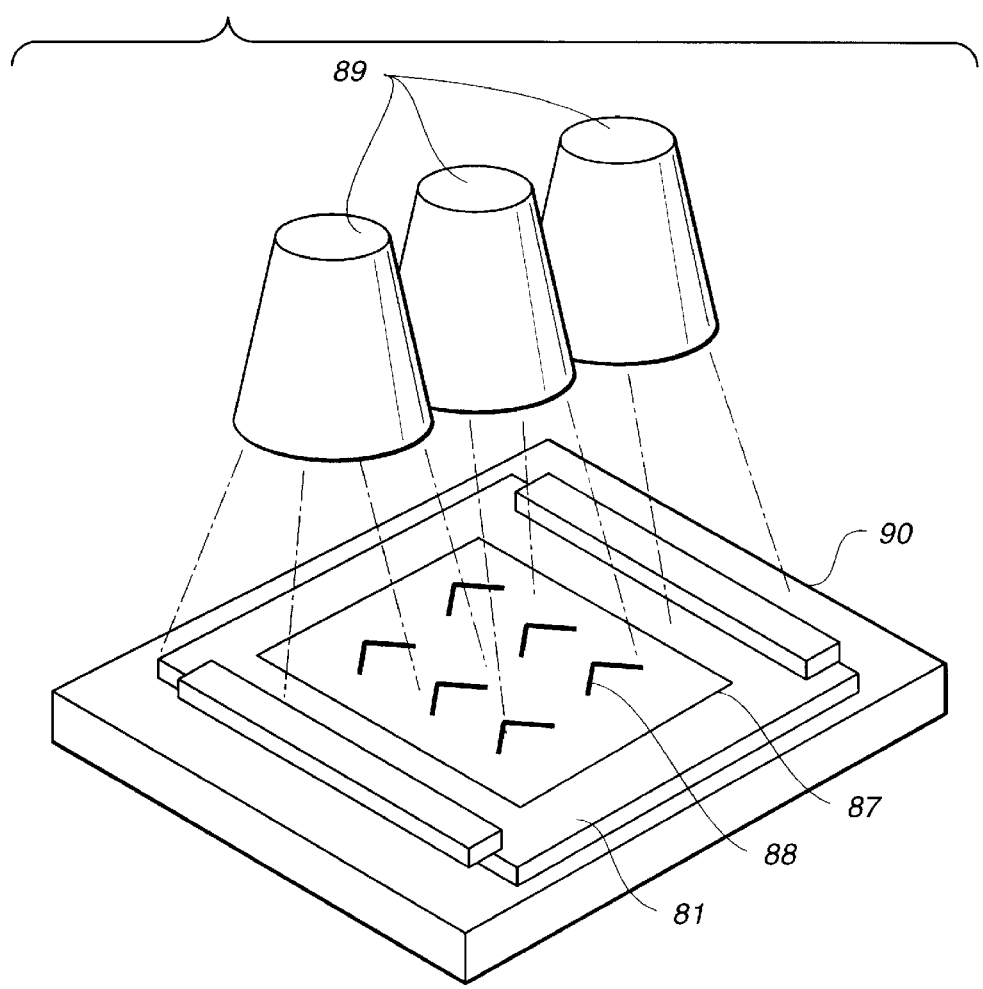
FIG._12

PHOTOLITHOGRAPHIC PRODUCTION OF MICROPROTRUSIONS FOR USE AS A SPACE SEPARATOR IN AN ELECTRICAL STORAGE DEVICE

RELATED APPLICATIONS

The present application is a continuation-in-part of U.S. application Ser. No. 958,506, now abandoned filed Oct. 7, 1992 and U.S. patent application Ser. No. 947,294, filed Sep. 18, 1992, now U.S. Pat. No. 5,464,453, which are both incorporated by reference in their entirety.

BACKGROUND OF THE INVENTION

1. Field of Invention

The present invention relates to a method to produce an electrically insulating space separator between two electrically conducting surfaces by photolithographic production of microprotrusions e.g., epoxy, or acrylic onto a substrate. This method produces multiple micro-sized standoffs (protrusions) useful in electronic devices to maintain small uniform electrode separations with large (greater than 90%) open cross-sectional area.

2. Background Art and Related Art Disclosures

There has been significant research over the years regarding electrical storage devices of high energy and power density. The efficient packaging of the active materials, with minimum wasted volume, is important in reaching these goals. The space separating two electrodes in a capacitor or a battery is necessary to electronically insulate the two electrodes. However, for efficient packaging, this space or gap should be a minimum. It would therefore by highly desirable to have a method to create a space separator or gap that is substantially uniform and of small dimension (less than 5 mil).

A common way to maintain separation between electrodes in an electrical storage device with an electrolyte present (such as a battery or capacitor) is by use of an ion permeable electrically insulating porous membrane. This membrane is commonly placed between the electrodes and maintains the required space separation between the two electrodes. Porous separator material, such as paper, glass, is useful for this application and is used in aluminum electrolytic and double layer capacitors. However, for dimensions below 1 or 2 mil in separation, material handling is difficult and material strength of the computer is usually very low. In addition, the open cross-sectional areas typical of these porous membrane separators are on the order of 50–70%.

A recent review by B. E. Conway in *J. Electrochem. Soc.,* Vol. 138 (#6), p. 1539 (June 1991) discusses the transition from "supercapacitor" to "battery" in electrochemical energy storage. He also identifies performance characteristics of various capacitor devices.

D. Craig, Canadian Patent No. 1,196,683, issued in November 1985, discusses the usefulness of electric storage devices based on ceramic-oxide coated electrodes and pseudo-capacitance. However, attempts to utilize this disclosure have resulted in capacitors which have inconsistent electrical properties and which are often unreliable. These devices cannot be charged to 1.0 V/cell and have large, unsatisfactory leakage currents. Furthermore, these devices have a very low cycle life. In addition, the disclosed packaging is inefficient.

M. Matroka and R. Hackbart, U.S. Pat. No. 5,121,288, issued Jun. 9, 1992, discusses a capacitive power supply based on the Craig patent which is not enabling for the present invention. A capacitor configuration as a power supply for a radiotelephone is taught; however, no enabling disclosure for the capacitor is taught.

J. Kalenowsky, U.S. Pat. No. 5,063,340, issued Nov. 5, 1991, discusses a capacitive power supply having a charge equalization circuit. This circuit allows a multicell capacitor to be charged without overcharging the individual cells. The present invention does not require a charge equalization circuit to fully charge a multicell stack configuration without overcharging an intermediate cell.

H. Lee, et al. in *IEEE Transactions on Magnetics*, vol 25 (#1), p.324 (January 1989) and G. Bullard, et al., in *IEEE Transactions on Magnetics,* vol.25 (#1) p. 102 (January 1989) discuss the pulse power characteristics of high-energy ceramic-oxide based double-layer capacitors. In this reference various performance characteristics are discussed, with no enabling discussion of the construction methodology. The present invention provides a more reliable device with more efficient packaging.

Carbon electrode based double-layer capacitors have been extensively developed based on the original work of Rightmire U.S. Pat. No. 3,288,641. A. Yoshida et al., in *IEEE Transactions on Components, Hybrids and Manufacturing Technology,* Vol. CHMT-10, #1,P-100–103 (March 1987) discusses an electric double-layer capacitor composed of activated carbon fiber electrodes and a nonaqueous electrolyte. In addition, the packaging of this double-layer capacitor is revealed. These devices are on the order of 0.4–1 cc in volume with an energy storage capability of around 1–10 J/cc.

T. Suzuki, et al., in *NEC Research and Development*, No. 82, pp. 118–123, July 1986, discloses improved self-discharge characteristics of the carbon electric double-layer capacitor with the use of porous separator materials on the order of 0.004 inches thick. An inherent problem of carbon based electrodes is the low conductivity of the material resulting in a low current density being delivered from these devices. A second difficulty is that the construction of multicell stacks is not done in a true bipolar electrode configuration. This results in inefficient packaging and lower energy and power density values.

Additional references of interest include, for example:

The state of solid state micro power sources is reviewed by S. Sekido in *Solid State Ionics*, Vol. 9, 10, pp. 777–782 (1983). M. Pham-Thi et al. in the *Journal of Materials Science Letters*, Vol. 5, p. 415 (1986) discusses the percolation threshold and interface optimization in carbon based solid electrolyte double-layer capacitors.

Various disclosures discuss the fabrication of oxide coated electrodes and the application of these electrodes in the chlor-alkali industry for the electrochemical generation of chlorine. See for example: V. Hock, et al. U.S. Pat. No. 5,055,169 issued Oct. 8, 1991; H. Beer U.S. Pat. No. 4,052,271 issued Oct. 4, 1977; and A. Martinsons, et al. U.S. Pat. No. 3,562,008 issued Feb. 9, 1971. These electrodes, however, in general do not have the high surface areas required for an efficient double-layer capacitor electrode.

Polymeric ion permeable porous separators have been used in carbon double layer capacitors as discussed by Sanada et al. in IEEE, pp.224–230, 1982 and Suzuki et al. in *NEC Research and Development,* No. 82, pp. 118–123, July 1986. These type of separators suffer from the problem of a small open area which leads to increased electrical resistance.

A method of using photoresist to fill voids of an electrically insulating layer to prevent electrical contact between two electrode layers for use as a solar cell is disclosed by J. Wilfried in U.S. Pat. No. 4,774,193, issued Sep. 27, 1988.

A process of creating an electrolytic capacitor with thin spacer using a photosensitive polymer resin solution is disclosed by Maruyama et al in U.S. Pat. No. 4,764,181 issued Aug. 16, 1988. The use of solution application methods described in a porous double-layer capacitor electrode would result in the undesirable filling of the porous electrode.

U.S. Patents of general interest include U.S. Pat. Nos. 3,718,551; 4,052,271; and 5,055,169.

None of these references individually or collectively teach or suggest the present invention.

All of the applications, patents, articles, references, standards, etc. cited in this application are incorporated herein by reference in their entirety.

It would be very useful to have a method to produce a reliable small space separation between electrodes in electrical storage devices with a large open cross-sectional area. It is, therefore, an object of the present invention to provide efficient packaging of an electrical storage device by reducing the gap between the anode and cathode and to reduce the electrical resistance of the ionically conducting electrolyte by providing large open cross-sectional areas of about 95–98%. The present invention provides such an improved method and improved device with energy densities of at least 20–90 J/cc, each cell of the capacitor or battery is charged to about 1 volt per cell, the voltage in each cell is essentially additive to produce devices of low to high charge storage capacity, and the devices operate in a double layer manner.

SUMMARY OF THE INVENTION

The present invention relates to a photolithographic method to produce microprotrusions which are uniform in height on a substrate to maintain space separation in an electrical storage device, which method comprises:

(a) obtaining an unexposed photoresist film which is essentially inert to subsequent electrolyte conditions and is electrically insulating when cured:

(b) obtaining a thin electrode material comprising a thin flat electrically conducting metal sheet center coated on one or both flat sides with electrically conducting porous metal oxide or electrically conducting carbon;

(c) applying the photoresist film to one or to both flat sides of the electrode material;

(d) placing a mask having a plurality of small holes over the photoresist;

(e) exposing the photoresist to a light source of an intensity and for a time effective to substantially cure the light exposed photoresist material through the holes in the mask to create cured microprotrusions which are uniform in height, removing the mask;

(f) developing the photoresist film to leave the cured microprotrusions which are uniform in height on the surface of the electrode material and to remove unreacted film;

(g) further curing the remaining exposed material whereby the microprotrusions essentially retain their shape and dimensions.

In one aspect, the present invention related to an improved method to produce a dry preunit (10) of an electrical storage device for storage of electrical charge in a condition for contact with a nonaqueous or aqueous electrolyte, which method comprises:

(a) preparing a thin in thickness substantially flat sheet of electrically conducting support material coated on each flat side with the same or different thin layer of a second electrically conducting material having a high surface area, optionally with the provision that both flat sides of the electrically conducting support is a sheet having the perimeter edge surfaces either:
  (i) having a thin layer of second high surface area electrically conducting material,
  (ii) are partly devoid of second high surface area electrically conducting material, or
  (iii) are devoid of second high surface area electrically conducting material;

(b) creating an ion permeable or semipermeable space separator which is stable to the aqueous or non-aqueous electrolyte which is obtained by:
  (i) depositing substantially uniform in height groups of electrically insulating microprotrusions stable to the aqueous or non aqueous electrolyte, on the surface of at least one side of the thin layer of the second electrically conducting material,
  (ii) placing a thin precut ion permeable or semipermeable separator on one surface of the second electrically conducting material, or
  (iii) casting an ion permeable or semipermeable thin layer on the surface of at least one side of the electrically conducting material, or
  (iv) creating a thin air space as separator;

(c) contacting the perimeter edge surface of one or both sides of the thin sheet of step (b) with one or more thin layers of synthetic organic polymer as a gasket material selected from the group consisting of a thermoplastic and a thermoset polymer;

(d) placing on or within the gasket material and optionally across the thin sheet at least one thin cord of a different material which cord has a higher melting point (Tm) than the gasket polymer material and does not melt, flow, or permanently adhere to the gasket under the processing conditions;

(e) producing a repeating layered stack of the thin flat articles of sheet coated with metal oxide and separator produced in step (d) optionally having the end sheets consisting of a thicker support;

(f) heating the stack produced in step (e) at a temperature and applied pressure effective to cause the synthetic gasket material to flow, to adhere to, and to seal the edges of the stack creating a solid integral stack of layers of alternating electrically conductive sheet coated with second electrically conducting material and the ion permeable separator, optionally such that the gasket material creates a continuous integral enclosure;

(g) cooling the solid integral stack of step (f) optionally under slight pressure in an inert gas; and (h) removing the at least one thin cord of different material between each layer creating at least one small opening between the layers of electrically conducting sheet coated with second electrically conducting material.

In one embodiment the exterior end sheets have only one side coated with second high surface area electrically conducting material.

In another aspect, the present method includes a method to produce a dry preunit of a capacitor for storage of electrical charge, which method comprises:

(a) obtaining a thin thickness flat metal sheet support wherein the metal is selected from titanium, zirconium, iron, copper, lead, tin, zinc or combinations thereof, having a thickness of between about 0.1 and 10 mil coated on each flat surface with a thin layer of at least one metal oxide having a high surface area independently selected from metal oxides of the group consisting of tin, lead, vanadium, titanium, ruthenium, tantalum, rhodium, osmium, iridium, iron, cobalt, nickel, copper, molybdenum, niobium, chromium, manganese, lanthanum or lanthanum series metals or alloys or combinations thereof, possibly containing small percentage of additives to enhance electrical conductivity, wherein the thin metal oxide layer has a thickness of between about 0.1 and 100 microns, optionally with the provision that both flat surfaces of the electrically conducting sheet have the perimeter edge surfaces devoid of metal oxide;

(b) creating an ion permeable space separator which is stable to the aqueous or non-aqueous electrolyte selected from:

(i) depositing by screen printing or photolithography a substantially uniform in height array of electrically insulating microprotrusions which are stable to an aqueous or non-aqueous electrolyte having a height of between about 0.1 and 10 mil on the surface of one or both sides of the thin layer of metal oxide, (ii) placing a thin precut ion permeable electrically insulating separator having a thickness of between about 0.1 and 10 mil on one flat surface of the metal oxide layer;

(iii) casting an ion permeable or semipermeable separator having a thickness of between about 0.1 and 10 mil on at least one surface of the second electrically conducting material; or (iv) creating a thin air space as a separator;

(c) contacting the perimeter edge surface of one or both sides of the thin electrically conducting sheet of step (b) with one or more thin layers of synthetic organic polymer as a gasket material wherein the polymer is selected from polyimides, TEFZEL®, polyethylenes, polypropylenes, other polyolefins, polysulfone, other fluorinated or partly fluorinated polymers or combinations thereof;

(d) placing on or within the gasket material and optionally across the thin flat sheet at least one thin cord of a different material which has a higher melting temperature ($T_m$) than the polymeric gasket material, which cord does not melt, flow or adhere to the gasket material under the processing conditions described herein;

(e) assembling a repeating layered stack of the thin flat articles of sheet coated with metal oxide and separator produced in step (d) optionally having end sheets having only one side coated and/or being made of thicker support material;

(f) heating the layered stack of step (e) at 0° to 100° C. greater than $T_m$ causing the gasket material to flow, to adhere to, and to seal the edges of the layered stack creating a solid integral layered stack of sheet and separator optionally enclosing the stack in an integral polymer enclosure;

(g) cooling to ambient temperature the solid integral stack of step (f) in an inert environment; and (h) removing the at least one thin cord between each layer creating at least one small opening between the electrode layers.

In other aspects, the present invention relates to the improved storage devices produced by the above cited methods when the electrodes are further contacted with an aqueous or non-aqueous electrolyte optionally deoxygenated.

Preferably the insulator material is an organic epoxy polymer, acrylic polymer or combinations thereof.

BRIEF DESCRIPTION OF DRAWINGS

FIG. 1 is a perspective view of the exterior of the dry preunit (10) with the cords present (17A) and after being pulled out (17C).

FIG. 2 is a cross-sectional view of the dry preunit along line 2—2 showing the edge of the dry preunit prior to heating to fuse the gaskets. For depiction purposes only the cords have been removed in all except one case (17A). The end sheet support (11 and 11A) as well as the coating (12 and 12A) are also depicted.

FIG. 2A is a cross-sectional view of the dry preunit along line 2A—2A showing the central area of the dry preunit prior (again, for depiction purposes only most of the cords have been removed) to heating to fuse the gasket material (14C and 14D). The electrode support material (15) and the coating (16 and 16A) for the internal bipolar electrodes are depicted. The open space between electrode surfaces optionally contains microprotrusions, a thin porous film, or a cast porous film as a separator.

FIG. 3 is a schematic representation of an exploded view of the dry preunit with cords present in the typical staggard configuration (17A, 17B, and 17C). Bipolar electrodes consisting of a support (15) and coating (16 and 16A) with microprotrusions (13) are depicted with gasket material (14A, 14B, 14C and 14D). The end plate assembly (18A and 18B) are depicted with coating on only one side.

FIG. 4 is a schematic of the steps in the fabrication of the dry pre-unit.

FIGS. 5 and 5A are scanning electron microscope (SEM) pictures of the electrode surfaces having microprotrusions at 16 power and 65 power, respectively.

FIGS. 6 (at 16 power) and 6A (at 65 power) are scanning electron microscope (SEM) pictures of the stacked device depicting the tabs 17A and fillports 17D of the dry preunit.

FIG. 7 is a schematic representation of the method to produce the microprotrusions of the present invention.

FIG. 8 is a photograph of the surface of the electrode showing the microprotrusion pattern formed at 8.3 power magnification.

FIG. 9 is a photograph at a top view of the surface of the electrode showing the micro protrusion pattern formed at 20.6 power magnification.

FIG. 10 is a schematic representation of the hot rollers used for laminating the photoresist to the electrode component prior to photolithography.

FIG. 11 shows a schematic representation of a mask placed over the photoresist.

FIG. 12 shows a schematic representation of the exposure of the unprotected portions of the photo resist to cause reaction.

DETAILED DESCRIPTION OF THE INVENTION

Definitions

As used herein:

"Cord" or "tab" refers to the thin strips of material included in the method of manufacture of the dry preunit. The removal of the cord produces the open fill ports.

"Electrically conducting support material" refers to any electrically conducting metal or metal alloy, electrically conducting polymer, electrically conducting ceramic, electrically conducting glass, or combinations thereof. Metals and metal alloys are preferred for producing stock units. The support material should have a conductivity of greater than about $10^{-4}$ S/cm.

"Photoresist" is any photo curable material. Usually it is an epoxide or acrylate or combinations thereof.

"ConforMASK" is a negative working photopolymer available commercially from Dynachem of Tustin, Calif.

This polymer should be used at 50% or less relative humidity.

"Epoxy" refers to the conventional definition of the product which is an epoxy resin mixes with a specific curing agent, usually a polyamine, of polyepoxide mixed with a polyamine curing agent.

"Metal oxide" refers to any electrically conducting metal oxide.

"Mixed metal oxide" refers to an electrically conducting oxide compound of two or more metal oxides.

"Second electrically conducting material" (having a high surface area) refers to porous electrode coating which may be of the same or different composition on each side of the support material. Preferred metal oxides include those independently selected from tin, lead, vanadium, titanium, ruthenium, tantalum, rhodium, osmium, iridium, iron, cobalt, nickel, copper, molybdenum, niobium, chromium, manganese, lanthanum, or lanthanum series metals or alloys or combinations thereof, and possibly containing additives like calcium to increase electrical conductivity.

"Support" refers to the electrically conducting metal, alloy, ceramic or the like.

The focus of the present invention is to produce a series of microprotrusions on the surface, or alloys thereof. The substrate is usually in the shape of a thin metal plate as is conventional in the capacitor art.

Referring to FIGS. 1 to 5, a general description for the improved method to produce the dry pre-unit 10 is as follows:

(A) Support Material Preparation

The electrode support (11, 11A and 15) is optionally etched or cleaned by a variety of conventional pickling and cleaning procedures.

In some experiments, if the metal surface is not etched it is too smooth. This smooth surface sometimes causes inadequate adhesion of the porous coating. The etch creates a suitable rough surface.

1. Wet Etching—A preferred procedure is contact of the metal support with aqueous inorganic strong acid, e.g. sulfuric acid, hydrochloric acid, hydrofluoric acid, nitric acid, perchloric acid or combinations thereof. The etching is usually performed at elevated temperatures of 50° to 95° C. (preferably 75° C.) for about 0.1 to 5 hr (preferably 0.5 hr.) followed by a water rinse. Room temperature acid etching is possible. An alkaline etch or an oxalic acid etch may also used.

2. Dry Etching—The roughened support surface is obtained by sputtering, plasma treatment, and/or ion milling. A preferred procedure is Ar RF sputter etching at between around 0.001 and 1 torr with about 1 KeV energy at 13.5 Mhz. Commonly, 0.1–10 watts/cm2 power densities for about 1–60 minutes are used to clean and roughen the surface. Another procedure is to plasma etch the support with a reactive gas such as oxygen, tetrafluoromethane, and/or sulfurhexafluoride at around 0.1–30 torr for about 1–60 min.

3. Electrochemical Etching—The roughened surface is obtained by electrochemical oxidation treatment in a chloride or fluoride solution.

(B) Coating of Support Material

The high surface area electrically conducting coating material (12, 12A, 16 and 16A) is applied onto the support material.

1. Solution Methods—The porous coating material may originate from various reactive precursors in a solution or of a sol-gel composition. Numerous methods of application of these precursor compositions are feasible; but not limited to the following. A curing and/or pyrolysis process usually is performed to form the coating on the support. Pyrolysis of the metal salts is usually done in a controlled atmosphere (nitrogen, oxygen, water, and/or other inert and oxidative gasses) by means of a furnace and/or an infrared source.

(a) Dip Coating—The support is dipped into a solution or sol-gel, coating the support with a precursor coating, and subsequently cured by pyrolytic and other methods. Optionally, this process may be repeated to increase layer thickness. A preferred procedure is dipping the support material into a metal chloride alcohol solution followed by pyrolysis at between about 250° and 500° C. for 5–20 min in a 5–100% oxygen atmosphere. This process is repeated until the desired weight of coating is obtained. A final pyrolysis treatment at 250°–450° C. is done for 1–10 hrs. Typically about 1–30 mg/cm$^2$ of coating is deposited onto a support for a capacitance density of around 1–10 F per a square centimeter electrode cross-sectional area. Another procedure is to create a sol-gel solution with ruthenium, silicon, titanium and/or other metal oxides and coat the support as above. By adjusting the Ph, water concentration, solvent, and/or the presence of additives like oxalic acid, formamide, and/or surfactants the discharge frequency characteristics of the coating may be adjusted.

(b) Spray Coating—The coating solution is applied to the support by a spray method, cured, and optionally repeated to increase the thickness. A preferred procedure is to apply the coating solution to the substrate at a temperature of 0°–150° C. by means of an ultrasonic or other spray nozzle with a flow rate of around 0.1–5 ml/min in a carrier gas composed of nitrogen, oxygen and/or other reactive and inert gases. The coating characteristics can be controlled by the partial pressure of oxygen and other reactive gasses.

(c) Roll Coating—The precursor coating is applied by a roll coating methodology, cured, and optionally repeated to increase the thickness. The coatings used for dip coating are usable here.

(d) Spin Coating—A spin coating methodology is used to apply the precursor coating, and optionally repeated.

(e) Doctor Blading—A doctor blading methodology is used to apply the precursor coating, and optionally repeated.

2. Electrophoretic Deposition—The porous coating or precursor coating is applied to the support by electrophoretic deposition techniques, and optionally repeated.

3. Chemical Vapor Deposition—The porous coating or precursor coating may be applied by chemical vapor deposition techniques.

(C) Electrode Pretreatment

It has been found that a number of pretreatments (conditioning) or combinations thereof are useful to improve the electrical characteristics of the coating (e.g. electrochemical inertness, conductivity, performance characteristics, etc.). These treatments include for example:

1. Steam—The coated electrode is contacted with water saturated steam in a closed vessel at between 150° and 325° C. for between 1 to 6 hr. under autogenic pressure.

2. Reactive Gas The coated electrode is contacted one or more times with a reactive gas such as oxygen, ozone, hydrogen, peroxides, carbon monoxide, nitrous oxide, nitrogen dioxide, or nitric oxide at between ambient temperature and 300° C. at a reduced pressure or under pressure. A preferred procedure is to contact the coated electrode with flowing ozone at between about 5–20 weight percent in air at between ambient and 100° C. and 0.1–2000 torr pressure for 0.1–3 hours.

3. Supercritical Fluid—The coated electrode is contacted with a supercritical fluid such as carbon dioxide, organic solvent, and/or water. A preferred procedure is treatment with supercritical water or carbon dioxide for 0.1–5 hrs by first raising the pressure then the temperature to supercritical conditions.

4. Electrochemical The coated electrode is contacted with an anodic current sufficient to evolve oxygen gas and subsequently with a cathodic current. In one embodiment the electrode is contacted with 10 mA/cm$^2$ in sulfuric acid for about 5 min, to evolve oxygen gas. The electrode is then switched to a cathodic current and the open circuit potential is driven back to a potential of about 0.5 V (vs. NHE) without hydrogen gas evolution.

5. Reactive liquid The coated electrode is contacted with an oxidizing liquid such as aqueous solutions of hydrogen peroxide, ozone, sulfoxide, potassium permanganate, sodium perchlorate, chromium(VI) species and/ or combinations thereof at temperatures around ambient to 100° C. for 0.1–6 hrs. A preferred procedure uses a 10–100 mg/l aqueous solution of ozone at 20°–50° C. for around 0.5–2 hrs. followed by an aqueous wash. An additional procedure is to treat the coated electrode in a chromate or dichromate solution.

(D) Spacing between Electrodes

A number of methods are available to obtain electrical insulation and properly defined spacing between the electrodes. These methods include, for example:

1. Microprotrusions—The separator between the electrodes is a matrix of small (in area and height) protrusions (13) on the surface of at least one side of the electrode. These microprotrusions which are uniform in height may be composed of thermosets, thermoplastics, elastomers, ceramics, or other electrically insulating materials. Several methods of applying these microprotrusions are included but not limited to:

(a) Screen Printing—The microprotrusions are placed on the electrode surface by conventional screen printing. Various elastomers, thermosets, and thermoplastics are applied in this way. A preferred procedure is to use an acid resistant epoxy or Viton solution.

(b) Chemical Vapor Deposition—Microprotrusions are also placed on the electrode surface by depositing silica, titania and/or other insulating oxides or materials through a mask.

(c) Photolithography—see below.

2. Physically thin separator sheet—The separator between the electrodes is a thin, substantially open structure material such as glass. A preferred material is 0.001–0.005 inch porous glass sheet available from Whatman Paper Ltd.

3. Casting a separator—The separator between the porous material is also obtained by casting a thin, substantially open structure film such as for example Nafion®, polysulfones, or various aero- and sol-gels.

4. Air space—The separator between the electrodes is also an air space which is subsequently occupied by the non-aqueous or aqueous electrolyte.

(E) Gasketing

The materials used for the gaskets (14A, 14B, 14C and 14D) at the edge of the active electrode surface include any organic polymer which is stable in the electrical/chemical environment, and to the processing conditions. Suitable polymers include, for example polyimide, TEFZEL®, polyethylene (high and low density), polypropylene, other polyolefins, polysulfone, other fluorinated or partly fluorinated polymers or combinations thereof. The gasket may be applied as a preformed material, screen printed, or by other methods.

(F) Cord for Fillport

The cord (17A, 17B and 17C) for the creation of the fillport is of any suitable material having some specific properties, e.g., it is different from the gasket materials has a higher melting temperature (Tm) than the gasket material and does not melt, flow or adhere to the gasket material under the heating conditions described herein. Generally, glass, metal, ceramic, and organic polymers or combinations thereof are used.

(G) Stacking

A stack is created by starting with an endplate and alternating gasket material, cord, electrode, gasket, cord electrode until the desired number of cells is created ending with a second endplate and optionally with a gasket material on the top outside of the stack.

(H) Assembling (heating and cooling)

The stack is heated under pressure to cause reflow of the gasket material, adhering and sealing the perimeter of the electrode materials to the adjacent electrode in the stack; thereby, creating isolated cells and an assembled stack unit.

(a) Radio Frequency Induction Heating is used to heat the stack to cause reflow of the gasket material.

(b) Radiant Heating is used to uniformly heat the stack to cause reflow of the gasket material. A preferred method is to use 1–100 $\mu$m radiation at 0.5–10 watts/cm$^2$ for 1–20 min.

(c) Conductive and/or convective heating in a furnace, optionally in an inert atmosphere, is used to heat the stack to cause reflow of the gasket material.

(I) Creating the fillport

The cords are pulled to remove them from the assembled unit to create a dry preunit with at least one fillport per a cell.

(J) Post-Conditioning

It has been found that a number of post-conditioning reactive gas treatments of the stack or assembled stack or combinations thereof are useful to improve the electrical characteristics of the electrode and resulting device. These include either before step (H) and/or after step (I) treatment with hydrogen, nitric oxide, carbon monoxide, ammonia, and other reducing gasses or combinations thereof at between ambient temperature and the Tm of the gasket material at a reduced pressure or under pressure.

(K) Filling of Dry Preunit

The dry preunit is filled with an ionically conducting aqueous or non-aqueous electrolyte.

(L) Sealing of Fillports

The fillports are sealed by reflowing an additional film of polymer the same or different over the openings to create a device. This is commonly done with an induction heater, locally heating the film over the fillport opening.

(M) Burn-In

The device is brought to full charge by initially charging the device to 0.1 V/cell at a charging current of about 4 mA/cm$^2$.

(N) Testing

Termination Methods—Several methods are used to make electrical connections to Ultracapacitor endplates as described below as examples.

1. Endplate Tabs (60 and 60A). The endplates (18A and 18B) themselves have been cut to extend out beyond the normal gasket perimeter. These extensions allow attachment of a wire or ribbon. Typically, the extension is a stub from which all oxide material is removed down to the bare titanium; 5 mil thick nickel ribbon is spot welded to the stub.

2. Silver Epoxy The oxide coating is removed from the exposed faces of the endplates or the endplates may be coated only on one side. Clean nickel foil leads make electrical connection to the exposed faces by bonding them together with a conductive silver epoxy.

3. Lugs Threaded titanium nuts are welded to the thick titanium endplates before coating. Electrical connection to the titanium nuts is achieved by screw attachment.

4. Press Contacts The oxide is removed or the endplates may be coated only on one side from the exposed side of the endplates before assembly into the device stack. The bare titanium is reversed sputtered to clean the surface, being careful not to overheat the substrate. The clean surface is then sputtered with titanium to lay down a clean adhesion layer, followed by gold. The gold acts as a low contact resistance surface to which electrical contact can be made by pressing or by wire bonding.

5. Deposition of a compatible medium such for example aluminum, gold, silver, etc. outside by CVD or other means.

The device resistance is measured at 1 kHz. The device capacitance is determined by measuring the coulombs needed to bring the device to full charge at a charging rate of around 4 mA/cm$^2$ of electrode area. Leakage current is measured as the current needed to maintain a full charge after 30 min. of charging.

These devices may be made in various configurations depending on the desired application. By adjusting the device voltage, cell voltage, electrode area, and/or coating thickness in a rational manner, devices made to fit defined specifications can be constructed.

The electrode capacitance density (C' in units of F/cm$^2$) is roughly 1 F/cm$^2$ for every 10 $\mu$m of coating. Therefore, for large capacitance values a thicker coat is used. The device capacitance (C) is equal to the electrode capacitance density times the electrode area (A in units of cm$^2$) divided by two times the number of cells (n) (equation 1).

The leakage current (i") is proportional to the electrode area, while the equivalent series resistance (ESR) is inversely proportional to the electrode area (eqn. 2). Typical values for i" are less than 20 $\mu$A/cm$^2$.

The total number of cells in a device (n) is equal to the cell voltage (V') divided by the total device voltage (V) (eqn. 3). Cell voltages up to about 1.2 V can be used. The device height (h), based on a cell gap (h') and a support thickness (h"), is determined from the number of cells and the electrode capacitance density in units of cm by equation 4.

The device ESR is a function of the number of cells times the cell gap (h') times the resistivity of the electrolyte (r) times a factor of about 2 divided by the area (equation 5).

$$C = C'A/2n \qquad \text{eqn. 1}$$

$$i'' \propto A \propto 1/ESR \qquad \text{eqn. 2}$$

$$n = V/V' \qquad \text{eqn. 3}$$

$$h/cm = n(0.002C' + h' + h'') \qquad \text{eqn. 4}$$

$$ESR \approx 2nh'r/A \qquad \text{eqn. 5}$$

Devices are constructed to meet the requirements of various applications by considering the voltage, energy, and resistance requirements. The following examples are not meant to be limiting in any way:

For electric vehicle applications about a 100 KJ to 3 MJ device is used. A large voltage (about 100 to 1000 V) large energy (1–5 F/cm$^2$) storage device is used with an electrode area of about 100 to 10000 cm$^2$.

For electric heated catalyst applications for reduction of automobile cold start emissions about a 10 to 80 KJ device is used. This device is about 12 to 50 V constructed with around 100 to 1000 cm$^2$ area electrodes of 1–5 F/cm$^2$. Optionally, a device consisting of several devices in parallel can be constructed to meet the electrical requirements.

For defibrillator applications about a 200–400 V device with 0.5 to 10 cm$^2$ area electrodes of 1–3 F/cm$^2$ are used.

For uninterruptable power source applications various series/parallel device configurations may be used.

The electrode substrate is usually a thin metal sheet such as titanium, zirconium, nickel, aluminum or alloys thereof. The substrate is usually in the shape of a thin metal plate, between about 0.1 and 10 mil thick as is conventional in the capacitor art.

The substrate is then coated on one or both sides with a carbon compound or a porous oxide coating selecting from titanium, ruthenium, tantalum, iridium, or mixtures thereof. This step is accomplished by methods conventional in the art and described herein. The oxide coating serves as the charge storage area for the device. The thickness of the oxide is usually between about 0.1 and 100 microns.

Alternately, a stacked set of battery electrodes (e.g. lead for lead acid) or electrolytic capacitor electrodes (e.g. alumina and tantalum) may be fabricated.

It is important that the flat surfaces of adjacent substrates do not contact each other and further be of a uniform separation.

The photoresist is applied either by vacuum lamination using the commercially available Dynachem Conform-MASK film applicator, and Dynachem vacuum applicator Model 724/730, or by passing the photo resist film and electrode through heated rollers.

Exposure is done using a standard 1–7 kW UV exposure source, such as a mercury vapor lamp.

The ConforMask is developed using standard conditions such as 0.5–1.0% sodium or potassium carbonate monohydrate in either a developing tank or a conveyorized aqueous developer. Optionally, after developing the electrode with microprotrusions may be neutralized in a dilute 10% sulfuric acid solution. This removes all the unwanted unreacted film to leave the reacted microprotrusions adhered to the electrode surface.

To obtain optimum physical and electrical performance properties the resulting material is put through a final curing process involving both UV irradiation and thermal treatment utilizing conventional UV curing units and convection air ovens.

The multiple electrodes are assembled to produce for instance a capacitor (10 in-exploded view) as described in detail in pending U.S. Ser. No. 947,294. Referring to FIG. 3, the metal oxide coated (16 and 16A) substrate 15 has microprotrusions 13 in place for the desired uniform separation. The photolithographic protrusions have a height of between about 0.1 and 10 mil from the oxide surface. The photolithographic protrusions have a top cross-sectional surface area of between $1 \times 10^{-8}$ in$^2$ to 0.01 in$^2$, preferably between about $1 \times 10^{-6}$ to $1 \times 1.^{-4}$ in$^2$. Gaskets 14A, 14B and 14C are used to eventually seal the electrode spaces. Tabs 17A, 17B, 17C make it possible to produce small openings into the uniformly formed open space for backfilling with liquid electrolyte.

With regard to FIGS. 7 to 12, the microprotrusions which are uniform in height accomplish the desired uniform separation.

This electrode 16,15,16A having microprotrusions 13 is then combined with others assembled in a wet process or a dry process. If a dry process is used, the dry unit is then back filled with electrolyte.

It is important that the cured epoxy does not react with the liquid electrolyte eventually used in the fabrication of the capacitor having multiple layers of electrodes.

It is apparent that from these teachings the following are possible:

Increasing or decreasing the substrate electrode thickness will allow a increase or decrease in the microprotrusion spacing due to changes in support requirements.

Other epoxies or epoxy derivatives can be used.

Other microprotrusion pattern elements can be used such as squares, lines, crosses, etc.

UTILITY

The electrical storage devices produced having the claimed micro-protusions are useful as batteries, capacitors and the like.

The capacitors are useful for example in defibrillators, pacemakers, electric vehicles, portable telephones and the like.

The electrode having the microprotrusions in usually cut to the desired dimensions. Certainly even layered coated electrodes having microprotrusions can be produced. The coated electrode having microprotrusions produced herein is used for example in pending U.S. patent applications Ser. Nos. 947,414, 947,294 and 958,506.

The following Examples are provided to be descriptive and explanatory only. They are not to be construed to be limiting in any way.

EXAMPLE 1

Fabrication Of Dry Preunit (A) Coating Method

The support structure is prepared by etching a 1 mil titanium sheet with 35% HNO$_3$/1.5% HF at 60° C. for 5 min. The end plates are 5 mil titanium.

The oxide coating solution is 0.2M ruthenium trichloride trihydrate and 0.2M niobium pentachloride in tert-butanol (reagent grade).

The etched Ti sheets are dip-coated by immersion into the solution at ambient conditions. The coated sheet is submerged into the solution, held for about 1 sec and then removed.

After each coating, the oxide is dried at 70° C. for 10 min, pyrolyzed at 350° C. for 10 min and removed to cool to ambient temperature all in ambient atmosphere.

The dip-coating steps are repeated for 10 coats (or any desired number) rotating the Ti sheet so as to dip with alternate sides down.

The fully coated sheet is final annealed at 350° C. for 3 hrs in ambient atmosphere.

(B) Electrode Pretreatment

The coated electrode is contacted with saturated steam in a closed vessel at 280° C. for 3 hrs under autogenic pressure.

(C) Spacing

Microprotrusions are screen printed on one side of the electrode. The epoxy compound is EP21AR from Masterbond, Hackensack, N.J. See U.S. patent application Ser. No. 947,414, allowed, which is incorporated by reference in its entirety.

The epoxy protrusions are cured at 150° C. for 4 hrs. in air. The coated electrodes are next die-stamped to the desired shape.

(D) Gasket

A modified high density polyethylene (HDPE, improved puncture resistance and adhesion) 1.5 mil thick by 30 mil wide with outside perimeter the same as that of the electrode is placed on the electrodes on the same side as the microprotrusions and impulse heat laminated. The HDPE is PJX 2242 from Phillips-Joanna of Ladd, Ill.

(E) Cord

One cord (TEFZEL®) 1 mil thick by 10 mil wide is placed across the narrow dimension of the gasket and electrode surface and aligned between microprotrusions. The location of the cord is one of three positions centered, left of center, or right of center.

A second HDPE gasket is placed on the first gasket sandwiching the cord between the two gaskets.

The second gasket is impulse heated to adhere to the first gasket and to fix the cord in place.

(F) Stacking

Electrode/microprotrusion/gasket/cord/gasket units are stacked in a nonmetallic (ceramic) alignment fixture beginning with a 5 mil end plate unit to the desired number of cells and ending with a plain 5 mil end plate with the cords arranged such that the location is staggered-left, center, right in a three unit repeating cycle (end perspective). Light pressure is applied to the top of the stack through a ceramic piston block to maintain uniform alignment and contact throughout the stack.

(G) Reflow

A radio frequency induction heater (2.5 Kw) is used to heat the stack. The stack was placed centrally in the three turn, 3 inch diameter coil and heated for 90 seconds at a power setting of 32%. The unit is allowed to cool to ambient temperature.

(H) Cord Removal

The cords are removed by pulling the exposed ends to leave the open fill ports.

EXAMPLE 2

Fabrication Of Dry Preunit (A) Coating Method

The support structure is prepared by etching a 1 mil titanium sheet with 50% Hcl at 75° C. for 30 min. The end plates are 2 mil titanium.

The oxide coating solution is 0.3M ruthenium trichloride trihydrate and 0.2M tantalum pentachloride in isopropanol (reagent grade).

The etched Ti sheets are dip-coated by immersion into the solution at ambient conditions. The coated sheet is submerged into the solution, held for about 1 sec and then removed.

After each coating, the oxide is dried at 70° C. for 10 min. in ambient atmosphere, pyrolyzed at 330° C. for 15 min in a 3 cubic feet per hour flow of 50 vol. % oxygen and 50% nitrogen, and removed to cool to ambient temperature in ambient atmosphere.

The dip-coating steps are repeated for 30 coats (or any desired number) rotating the Ti sheet so as to dip with alternate sides down.

The fully coated sheet is final annealed at the above conditions for 3 hrs.

(C) Spacing

VITON® microprotrusions are screen or photolithographically printed on one side of the electrode screenprinting by adapting U.S. patent application Ser. No. 947,414 or by photolithography—U.S. Ser. No. 958,506. The VITON® protrusions are cured at 150° C. for 30 min. in air. The coated electrodes are next die-stamped to the desired shape.

(D) Gasket

A modified high density polyethylene (HDPE, improved puncture resistance and adhesion) 1.0 mil thick by 20 mil wide with outside perimeter the same as that of the electrode is impulse heat laminated to both sides of the electrode. The HDPE is PJX 2242 from Phillips-Joanna of Ladd, Ill.

(E) Cord

One cord, 1 mil diameter TEFLON® coated tungsten wire is placed across the narrow dimension of the gasket and electrode surface and aligned between microprotrusions. The location of the cord is one of three positions centered, left of center, or right of center.

(F) Stacking

Electrode/microprotrusion/gasket/cord/gasket units are stacked beginning with a 2 mil end plate unit to the desired number of cells and ending with a plain 2 mil end plate with the cords arranged such that the location is staggered-left, center, right in a three unit repeating cycle (end perspective).

(G) Reflow

The gasket is reflowed in nitrogen at 125° C. for 120 min. to reflow the thermoplastic. The unit is cooled in nitrogen to ambient temperature.

(H) Cord Removal

The cords are removed by pulling the exposed ends to leave the open fill ports.

EXAMPLE 3

Fabrication Of Dry Preunit (A) Coating Method

The support structure is prepared by etching a 1 mil titanium sheet with 50% Hcl at 75° C. for 30 min. The end plates are 10 mil titanium.

The oxide coating solution is 0.2M ruthenium trichloride trihydrate and 0.2M tantalum pentachloride in isopropanol (reagent grade).

The etched Ti sheets are dip-coated by immersion into the solution at ambient conditions. The coated sheet is submerged into the solution, held for about 1 sec and then removed.

After each coating, the oxide is dried at 70° C. for 10 min, pyrolyzed at 300° C. for 5 min and removed to cool to ambient temperature all in ambient atmosphere.

The dip-coating steps are repeated for 10 coats (or any desired number) rotating the Ti sheet so as to dip with alternate sides down.

The fully coated sheet is final annealed at 300° C. for 3 hrs in ambient atmosphere.

(B) Electrode Pretreatment

The coated electrode is contacted with saturated steam in a closed vessel at 260° C. for 2 hrs under autogenic pressure.

(C) Spacing

Microprotrusions are screen printed on one side of the electrode, U.S. Ser. No. 947,414 (or photolithographically printed—U.S. Ser. No. 958,506). The epoxy compound is EP21AR from Masterbond, Hackensack, N.J.

The epoxy protrusions are cured at 150° C. for 4 hrs. in air. The coated electrodes are next die-stamped to the desired shape.

(D) Gasket

A modified high density polyethylene (HDPE, improved puncture resistance and adhesion) 1.5 mil thick by 30 mil wide with outside perimeter the same as that of the electrode is placed on the electrodes on same side as the microprotrusions and impulse heat laminated. The HDPE is PJX 2242 from Phillips-Joanna of Ladd, Ill.

(E) Cord

One cord (Tefzel®) 1 mil thick by 10 mil wide is placed across the narrow dimension of the gasket and electrode surface and aligned between microprotrusions. The location of the cord is one of three positions centered, left of center, or right of center.

A second HDPE gasket is placed on the first gasket sandwiching the cord between the two gaskets.

The second gasket is impulse heated to adhere to the first gasket and to fix the cord in place.

(F) Stacking

Electrode/microprotrusion/gasket/cord/gasket units are stacked beginning with a 10 mil end plate unit to the desired number of cells and ending with a plain 10 mil end plate with the cords arranged such that the location is staggered-left, center, right in a three unit repeating cycle (end perspective).

(G) Reflow

The gasket is reflowed in nitrogen at 160° C. for 45 min. to reflow the thermoplastic. The unit is cooled in nitrogen to ambient temperature.

(H) Cord Removal

The cords are removed by pulling the exposed ends to leave the open fill ports.

EXAMPLE 4

Fabrication Of Device (A) Coating Method

The support structure is prepared by etching a 1 mil titanium sheet with 50% Hcl at 75° C. for 30 min. The end plates are 5 mil titanium.

The oxide coating solution is 0.2M ruthenium trichloride trihydrate and 0.2M Ti(di-isopropoxide)bis 2,4-pentanedionate in ethanol (reagent grade).

The etched Ti sheets are dip-coated by immersion into the solution at ambient conditions. The coated sheet is submerged into the solution, held for about 1 sec and then removed.

After each coating, the oxide is dried at 70° C. for 10 min, pyrolyzed at 350° C. for 5 min in oxygen and removed to cool to ambient temperature all in ambient atmosphere.

The dip-coating steps are repeated for 30 coats (or any desired number) rotating the Ti sheet so as to dip with alternate sides down.

The fully coated sheet is final annealed at 350° C. for 3 hrs in an oxygen atmosphere.

(C) Spacing

Microprotrusions are thermally sprayed through a mask on one side of the electrode. The thermal spray material is TEFLON® from E.I. du Pont de Nemours & Co., Wilmington, Del. The TEFLON® protrusions are cured at 300° C. for 0.5 hrs. in air. The coated electrodes are next die-stamped to the desired shape.

The microprotrusions are also obtained by photolithography—see U.S. Ser. No. 956,508.

(D) Gasket

A modified high density polyethylene (HDPE, improved puncture resistance and adhesion) 1.5 mil thick by 30 mil wide with outside perimeter the same as that of the electrode is placed on the electrodes on same side as the microprotrusions and impulse heat laminated. The HDPE is PJX 2242 from Phillips-Joanna of Ladd, Ill.

(E) Cord

One cord (TEFZEL®) 1 mil thick by 10 mil wide is placed across the narrow dimension of the gasket and electrode surface and aligned between microprotrusions. The location of the cord is one of three positions centered, left of center, or right of center.

A second HDPE gasket is placed on the first gasket sandwiching the cord between the two gaskets.

The second gasket is impulse heated to adhere to the first gasket and to fix the cord in place.

(F) Stacking

Electrode/microprotrusion/gasket/cord/gasket units are stacked beginning with a 5 mil end plate unit to the desired number of cells and ending with a plain 5 mil end plate with the cords arranged such that the location is staggered-left, center, right in a three unit repeating cycle (end perspective).

(G) Reflow

The gasket is reflowed in nitrogen at 190° C. for 30 min. to reflow the thermoplastic. The unit is cooled in nitrogen to ambient temperature.

(H) Cord Removal

The cords are removed by pulling the exposed ends to leave the open fill ports.

EXAMPLE 5

Fabrication Of Dry Preunit (A) Coating Method

The support structure is prepared by etching a 0.8 mil zirconium sheet with 1%HF/20% $HNO_3$ at 20° C. for 1 min. The end plates are 2 mil zirconium.

The oxide coating solution is 0.2M ruthenium trichloride trihydrate and 0.1M tantalum pentachloride in isopropanol (reagent grade).

The etched Ti sheets are dip-coated by immersion into the solution at ambient conditions. The coated sheet is submerged into the solution, held for about 1 sec and then removed.

After each coating, the oxide is dried at 85° C. for 10 min, pyrolyzed at 310° C. for 7 min and removed to cool to ambient temperature all in ambient atmosphere.

The dip-coating steps are repeated for 10 coats (or any desired number) rotating the Ti sheet so as to dip with alternate sides down.

The fully coated sheet is final annealed at 310° C. for 2 hrs in ambient atmosphere.

(C) Spacing

Microprotrusions are thermally sprayed through a mask on one side of the electrode. The thermal spray material is TEFLON® from E.I. du Pont de Nemours & Co., Wilmington, Del. The TEFLON® protrusions are cured at 310° C. for 1.0 hrs. in air. The coated electrodes are next die-stamped to the desired shape.

The protrusions also obtained using photolithography—see U.S. Ser. No. 956,508.

(D) Gasket

A polypropylene gasket 1.5 mil thick by 30 mil wide with outside perimeter the same as that of the electrode is placed on the electrodes on same side as the microprotrusions and impulse heat laminated.

(E) Cord

One cord, 1 mil diameter TEFLON® coated tungsten wire, is placed across the narrow dimension of the gasket and electrode surface and aligned between microprotrusions. The location of the cord is one of three positions centered, left of center, or right of center.

A second polypropylene gasket is placed on the first gasket sandwiching the cord between the two gaskets.

The second gasket is impulse heated to adhere to the first gasket and to fix the cord in place.

(F) Stacking

Electrode/microprotrusion/gasket/cord/gasket units are stacked beginning with a 2 mil end plate unit to the desired number of cells and ending with a plain 2 mil end plate with the cords arranged such that the location is staggered-left, center, right in a three unit repeating cycle (end perspective).

(G) Reflow

The gasket is reflowed in nitrogen at 195° C. for 60 min. to reflow the thermoplastic. The unit is cooled in nitrogen to ambient temperature.

(H) Cord Removal

The cords are removed by pulling the exposed ends to leave the open fill ports.

EXAMPLE 6

Filling Of The Electrode Space

A dry preunit may be filled with an electrolyte with the following procedure. Any of many possible dry preunit configurations may be used.

(H) Back Fill

The cords are removed to open the fillport. The stacked unit is placed into an evacuation chamber and evacuated to <35 mtorr for 5 to 60 min. The liquid electrolyte 3.8M $H_2SO_4$ de-airated with nitrogen is introduced into the chamber and fills the evacuated space between the electrodes.

(I) Seal Fillport Openings

The electrolyte filled preunit is removed from the chamber. It is rinsed with deionized water to remove excess electrolyte and dried. HDPE film (1.5 mil thick) is placed over the fillport openings and impulse heat sealed over the ports.

(J) Conditioning

The device is charged up to full charge beginning at 0.1 V/cell increasing by 0.1 V/cell until 1 V/cell is obtained.

(K) Testing

The device is tested in the conventional manner, having 1 V/cell with leakage current of less than 25 $\mu A/cm^2$, and a capacitance density per a cell of greater than about 0.1 F/cm². A 10 V device has a height of no more than 0.05", a 40 V device has a height of no more than 0.13", and a 100 V device has a height of no more than 0.27".

Performance characteristics for various device geometries and configurations based on a sulfuric acid electrolyte are presented in Table 1.

TABLE 1

Device Performance Characteristics

| Area/cm² | 2 | 2 | 2 | 2 | 25 | 25 |
|---|---|---|---|---|---|---|
| volt | 10 | 40 | 100 | 100 | 100 | 100 |
| C/mF | 26 | 6.7 | 2.6 | 10 | 150 | 753 |
| ESR/mohm | 100 | 330 | 780 | 780 | 62 | 70 |
| vol/cc | 0.29 | 0.73 | 1.6 | 1.6 | 11 | 32 |
| J/cc | 4.5 | 7.4 | 8.1 | 31 | 69 | 116 |
| watt/cc | 860 | 1660 | 2000 | 2000 | 3670 | 1100 |

EXAMPLE 7

Filling Of The Electrode Space

A dry preunit may be filled with an electrolyte with the following procedure. Any of many possible dry preunit configurations may be used.

(H) Back Fill

The cords are removed to open the fillport. The stacked unit is placed into an evacuation chamber and evacuated to <35 mtorr for 5 to 60 min. The liquid non-aqueous electrolyte 0.5M $KPF_6$ in propylene carbonate de-airated with nitrogen is introduced into the chamber and fills the evacuated space between the electrodes.

(I) Seal Fillport Openings

The electrolyte filled preunit is removed from the chamber and excess electrolyte is removed. HDPE film (1.5 mil thick) is placed over the fillport openings and impulse heat sealed over the ports.

(J) Conditioning

The device is charged up to full charge beginning at 0.1 V/cell increasing by 0.1 V/cell until 1.5 V/cell is obtained.

(K) Testing

The device is tested in the conventional manner, having 1.5 V/cell with leakage current of around 100 $\mu A/cm^2$, and a capacitance density of around 4 mF/cm² for a 10 cell device.

EXAMPLE 8

Device Post-Treatment Conditions

The following is a list of the electrical properties (Table 3) of devices using various gas postconditioning techniques to adjust the electrode rest potential so that charging to at least 1 V/cell on multicell devices filled with 4.6M sulfuric acid electrolyte is possible and reduced leakage currents are observed. This treatment is done before, during, and/or after reflow of the gasket material. For gas treatment at temperatures below that used for gasket reflow the atmosphere was exchanged with an inert gas such as nitrogen or argon during reflow. For treatment after reflow of the gasket material the tabs were removed before treatment. During treatment the atmosphere is evacuated and filled with the reactive gas periodically.

TABLE 3

Device characteristics for various postconditioning.

| gas | T/°C. | t/min. | i"/$\mu A/cm^2$ | V/cell |
|---|---|---|---|---|
| $H_2$ | 50 | 20 | 8 | 1.0 |
| CO | 100 | 170 | 40 | 1.0 |
| CO | 90 | 103 | 12 | 1.0 |
| CO | 90 | 165 | 20 | 1.0 |
| CO | 80 | 120 | 25 | 1.1 |
| NO | 75 | 20 | 27 | 1.0 |
| NO | 95 | 140 | 21 | 1.1 |
| $NH_3$ | 85 | 30 | 26 | 1.0 |

EXAMPLE 9

Hot Roller Photolithographic Production of Microprotrusions

The following steps referring to FIGS. 3 and 7–12 are follows:

(A) The ConforMASK® 2000 high conformance solder mask of 1.5 mil in thickness is cut to the same size as the electrode.

(B) The photo resist film 81 is applied to the electrode material by placing the ConforMASK® film on the electrode material surface 16, after removing the release sheet 82 between the photo resist film 82 and electrode 16, and passing the laminate through heated rollers (84 and 85) (at 150° F.) to adhere the photo resist film 81 to the electrode surface 16. The polyester cover sheet 82A on the outside of the photo resist film 81 is then removed.

(C) The dark field mask 87 containing rows of transparent holes (openings 88) is placed on the photo resist 81. A typical pattern consists of an array of holes 6 mil in diameter 40 mil center-to-center spacing with a higher density (20 mil center-to-center) for three rows on the perimeter of the electrode.

(D) The film 81 is exposed through holes 88 the mask 87 for 20 seconds to a conventional UV light source, 89 a mercury vapor lamp. The mask is removed.

(E) The unexposed area of the photo resist is developed or stripped by placing it in a tank with 1% potassium carbonate for 1.5 min.

(F) The electrode surface 16 with the microprotusion standoffs 13 is then washed with de-ionized water, placed in a tank with 10% sulfuric acid, for 1.5 min and a final de-ionized water rinse.

(G) First, the microprotrusions 13 are exposed to UV light. A final cure of the microprotrusions (standoffs) is done in a convection air oven at 300° F. for 1 hr.

The finished electrode is used directly or treated as described herein or in the pending parent or incorporated by reference applications.

EXAMPLE 10

Vacuum Lamination of Photo resist (A) The ConforMASK® 2000 high conformance solder mask of 2.3 mil in thickness is cut slightly larger than the electrode.

(B) The photo resist film is vacuum laminated to the electrode material and onto a supporting backing plate using standard operating conditions (160° C., 0.3 mbars) using a Dynachem vacuum applicator model 724 or 730. The polyester cover sheet is removed.

(C) The dark field mask containing rows of transparent holes is placed on the photo resist. A typical pattern consists of an array of holes 6 mil in diameter 40 mil center-to-center spacing with a higher density (20 mil center-to-center) for three rows on the perimeter of the electrode.

(D) The film is exposed for 20 to 40 seconds to a non-collimated UV light source of 3–7 KW power.

(E) The unexposed area of the photo resist is developed or stripped by using 0.5% potassium carbonate in a conveyorized spray developing unit, followed by a de-ionized water rinsing and turbine drying.

(F) A final cure of the standoffs is done in a two step process. First, the microprotrusions are exposed to UV light in a Dynachem UVCS 933 unit and then placed in a forced air oven at 300°–310° F. for 75 min.

The finished electrode is used directly or further treated as described herein and in the pending parent applications.

The device produced by the methods described in the claims have uses as an electrical source of power for applications independently selected from:

providing peak power in applications of varying power demands and be recharged during low demand (i.e. serving as means for a power conditioner, placed between the electrical generator and the electrical grid of the users;

providing power in applications where the electrical source may be discontinued and additional power is needed to power in the interim period or for a period to allow for a shutdown providing means for uninterruptable power source applications, comprising computer memory shutdown during electrical grey and brown outs, or power during periodic black outs as in orbiting satellites;

providing pulse power in applications requiring high current and/or energy comprising providing means for a power source to resistively heat catalysts, to power a defibrillator or other cardiac rhythm control device, or to provide pulse power in electric vehicle where in a battery or internal combustion engine could recharge the device;

providing power in applications that require rapid recharge with prolonged energy release comprising surgical instruments with out an electrical cord; or providing a portable power supply for appliance and communication applications.

Coating of Support Material

The coating (e.g. oxide) is porous and composed of mostly micropores (diameter<17 Å). Large 0.1–1 $\mu$m wide cracks are present on the surface protruding to depths as thick as the coating. However, greater than 99% of the surface area arises from these micropores. The average diameter of these micropores are around 6–12 Å.

After various post-treatments the pore structure can be altered to increase the average pore size. For example, the steam post-treatment creates a bimodal pore distribution. In addition to the micropores, a narrow distribution of mesopores (diameter<17–1000 Å) having a diameter of about 35 Å is created. These treated electrode coatings have 85–95% of the surface area arising from the micropore structure.

With alternate electrode construction methods this pore size distribution can be varied. The effective high surface area of the coating is 1000 to 10,000 to 100,000 times larger than the projected surface area of the electrode as a monolith. The pore size, distribution, and surface area controlled with the temperature of pyrolysis and/or high temperature water treatment. In addition, the use of surfactants to create micelles or other organized structures in the coating solution increases the average pore size up to values about 100–200 521 with only 5–10% of the surface area coming from micropores.

As illustrated in FIG. 13, the electrode 111A includes a porous and conductive coating layer 119, which is formed on at least one surface of the support material 116. The support material 116 is electrically conductive, and sufficiently rigid to support the coating layer 119 and to impart sufficient structural rigidity to the device 10.

One goal of the present invention, is to optimize the energy density and power density of the device 10. This object is achieved by reducing the thickness of the support material 116, and maximizing the surface area of the coating layer 119. The power density of the device 10 is further optimized, by maintaining a low resistance.

The surface area of the coating layer 119 is determined by the BET methodology, which is well known in the art. The surface enhancement, which is an indication of the optimization of the surface area of the coating layer 119, is determined according to the following equation:

Surface enhancement=(BET Surface Area/Projected Surface Area)

In the present invention, the surface enhancement values are as large as 10,000 to 100,000, and are usually greater than 50.

The coating layer 119 is porous, and its porosity could range between about five percent (5%) and ninety-five percent (95%). Exemplary porosity range for efficient energy storage is between about twenty percent (20%) and twenty-five percent (25%). The porous coating thickness is between about 1 and 200 micron, preferably between about 5 and 50 micron.

In conventional double-layer capacitors, the main device resistance is due to the carbon coating layer. In the present invention, most of the device resistance is due to the electrolyte, which has a higher resistance than that of the porous conductive coating layer.

While only a few embodiments of the invention have been shown and described herein, it will become apparent to those skilled in the art that various modifications and changes can be made in the photolithographic formation and applications of microprotrusions to provide substantially uniform spacing between electrodes of an electrical storage device without departing from the spirit and scope of the present invention. All such modifications and changes coming within the scope of the appended claims are intended to be carried out thereby.

What is claimed is:

1. A photolithographic method to produce microprotrusions which are substantially uniform in height on a porous substrate to maintain space separation between electrodes in an electrical storage device, which method comprises:

(a) obtaining an unexposed photoresist film which is essentially inert to subsequent electrolyte conditions and is electrically insulating when cured;

(b) obtaining a thin electrode material comprising a thin flat electrically conducting metal sheet coated on one or both flat sides with electrically conducting porous metal oxide or electrically conducting carbon;

(c) applying the photoresist film to one or to both flat sides of the electrode material;

(d) placing a mask having a plurality of small holes over the photoresist;

(e) exposing the photoresist to a light source of an intensity and for a time effective to substantially cure the light exposed photoresist material through the holes in the mask such that the photoresist material through the holes are exposed to about a uniform amount of light to create substantially cured microprotrusions of about uniform height followed by removing the mask;

(f) developing the photoresist film to leave the substantially cured microprotrusions on the surface of the electrode material and to remove unreacted film; and (g) further curing the remaining exposed substantially cured microprotrusions whereby the microprotrusions of substantially uniform height essentially retain their shape and dimensions.

2. The method of claim 1 wherein the device is selected from the group consisting of a capacitor and a battery.

3. The method of claim 2 wherein the electrically conducting porous metal oxide is an electrically conducting high surface area material selected from mixed metal oxides;

the electrode material is independently selected from the group consisting of titanium, zirconium, nickel, aluminum and alloys thereof; and the photoresist is a commercial solder mask.

4. The method of claim 1 wherein the electrically conducting porous metal oxide or carbon is an electrically conducting high surface area material.

5. The method of claim 4 wherein the electrically conducting high surface area material is substantially composed of carbon.

6. The method of claim 4 wherein the electrically conducting high surface area material is selected from the group consisting of a metal oxide and a mixed metal oxide.

7. The method of claim 6 wherein the mixed metal oxide is independently selected from the group consisting of ruthenium, titanium, tantalum, chromium, iridium and combinations thereof.

8. The method of claim 1 wherein in step (c) the photoresist film is applied to one side of the electrode material and in step (d) the mask is laminated over the photoresist using a hot roller pressure technique at between about 100° to 200° F.

9. The method of claim 8 wherein the temperature is about 150° F.

10. The method of claim 1 wherein the photoresist film comprises an organic photo-curable epoxide polymer, an organic photo-curable acrylate polymer or combinations thereof.

11. The method of claim 1 wherein in step (b) the metal oxide coats both sides of the electrode, in step (c) the film is applied to one flat side using a hot roller technique, in step (f) developing occurs using dilute aqueous base and in step (g) using light, heat or a combination thereof to further cure the microprotrusions.

12. The method of claim 1 wherein in step (c) the photoresist is applied by vacuum lamination.

13. A photolithographic method to produce microprotrusions which are substantially uniform in height on a porous substrate to maintain space separation between electrodes in an electrical storage device, which method comprises:

(a) obtaining an unexposed photoresist film which is essentially inert to subsequent electrolyte conditions and is electrically insulating when cured;

(b) obtaining a thin electrode material comprising a thin flat electrically conducting metal sheet coated on one or both flat sides with electrically conducting porous metal oxide or electrically conducting carbon;

(c) applying the photoresist film to one or to both flat sides of the electrode material;

(d) placing a mask having a plurality of small holes over the photoresist;

(e) exposing the photoresist to a light source of an intensity and for a time effective to substantially cure the light exposed photoresist material through the holes in the mask such that the photoresist material through the holes are exposed to about a uniform amount of light to create substantially cured microprotrusions which are substantially uniform in height followed by removing the mask;

(f) developing the photoresist film to leave the substantially cured microprotrusions on the surface of the electrode material and to remove unreacted film; and (g) further curing the remaining exposed substantially cured microprotrusions whereby the substantially uniform in height microprotrusions essentially retain their shape and dimensions, wherein in step (b) the flat metal sheet is selected from titanium, zirconium, iron, copper, lead, tin, nickel, zinc or combinations thereof, having a thickness of between about 0.1 and 10 mil, and the metal sheet is coated on each flat surface with a thin layer of at least one metal oxide having a high surface area which metal oxide is independently selected from metal oxides from the group consisting of oxides of tin, lead, vanadium, titanium, ruthenium, tantalum, rhodium, osmium, iridium, iron, cobalt, nickel, copper, molybdenum, niobium, chromium, manganese, lanthanum, other metals of the lanthanum series and combinations thereof, and said thin metal oxide layer has a thickness of between about 0.1 and 100 microns.

14. The method of claim 13 wherein in step (d) the mask is laminated over the photoresist using a hot roller technique at between about 150° to 200° F.

15. The method of claim 14 wherein the temperature is about 150° C.

16. The method of claim 13 wherein the photoresist film comprises an organic photo-curable epoxide polymer, an organic photo-curable acrylate polymer or combinations thereof.

17. The method of claim 16 wherein the photoresist is an organic photo-curable epoxide polymer.

18. The method of claim 13 wherein the metal oxide is a mixed metal oxide, and the photoresist is a negative working photopolymer.

19. The method of claim 13 wherein the mixed metal oxide has an electrically conducting high surface area.

20. The method of claim 13 wherein in step (b) only carbon in particle form is coated on the electrically conducting material sheet.

* * * * *